United States Patent [19]

Ito

[11] Patent Number: 4,491,712
[45] Date of Patent: Jan. 1, 1985

[54] FABRICATING MACHINE

[75] Inventor: Tetsuro Ito, Aichi, Japan

[73] Assignee: Mitsubishi Denki Kabushiki Kaisha, Tokyo, Japan

[21] Appl. No.: 300,864

[22] Filed: Sep. 10, 1981

[30] Foreign Application Priority Data

| Sep. 10, 1980 [JP] | Japan | 55-125798 |
| Sep. 17, 1980 [JP] | Japan | 55-129868 |
| Sep. 19, 1980 [JP] | Japan | 55-130166 |
| Sep. 19, 1980 [JP] | Japan | 55-130167 |

[51] Int. Cl.³ ............................................. B23P 1/08
[52] U.S. Cl. ................................. 219/69 G; 219/69 S
[58] Field of Search ............... 219/69 G, 69 M, 69 S, 219/69 V, 69 R, 68

[56] References Cited

U.S. PATENT DOCUMENTS

| 3,860,779 | 1/1975 | Marendaz | 219/69 G |
| 3,975,608 | 8/1976 | Ullmann et al. | 219/69 G |
| 4,247,749 | 1/1981 | Wavre | 219/69 M |
| 4,370,537 | 1/1983 | Oizumi et al. | 219/69 G |

FOREIGN PATENT DOCUMENTS 0164431 12/1980 Japan .................................. 219/69 M
8102127 8/1981 World Intel. Prop. Org. ... 219/69 G Primary Examiner—M. H. Paschall
Attorney, Agent, or Firm—Sughrue, Mion, Zinn, Macpeak, and Seas

[57] ABSTRACT

A fabricating machine in which a machining tool or electrode is used to machine a workpiece and is subsequently moved relative to the workpiece in a direction perpendicular to the tool or the electrode machining direction in a circular motion relative to the workpiece for machining the workpiece while gradually expanding or reducing the moving path of the tool or the electrode in a predetermined amount including discriminating means for determining whether or not the electrode is in a machining enabling state or in a machining disabling state for the workpiece, and tool or electrode moving path deciding means for expanding or reducing the moving path of the tool or the electrode in a predetermined relationship. The electrode speed can also be varied in response to the detected machining state. Thus, a preferable finish machining can be performed with a sufficient machining efficiency by optimally controlling the increased machining margin and speed of the electrode in response to the machining capacity when the electrode is moved in a circular motion.

18 Claims, 14 Drawing Figures

FABRICATING MACHINE

BACKGROUND OF THE INVENTION

The present invention relates to a fabricating machine in which a machining tool or a machining electrode intrudes into a workpiece and is subsequently moved relative to the workpiece in a direction substantially perpendicular to the tool or electrode machining direction. More particularly, the invention relates to improvements in a discharge machining method and apparatus in which a workpiece is machined by electric discharge which is carried out between the workpiece and the machining electrode while the electrode is moved relative to the workpiece in a coarse, primary or main machining direction and is subsequently finish machined while the electrode is moved relative to the workpiece substantially in a direction perpendicular to the main machining direction and accordingly in a circular motion.

In a conventional fabricating machine such as, for example, discharge machining method and apparatus, a workpiece is machined by electric discharge which is carried out between the workpiece and the machining electrode while the electrode intrudes into or is moved relative to the workpiece in a coarse, primary or main machining direction and is normally controlled by a servo so that the electrode is maintained at a constant distance from the workpiece in the same machining direction so as to machine the workpiece. In an ordinary conventional discharge machining operation, after the workpiece is coarsely or primarily machined, it is successively finish machined with a plurality of machining electrodes of similar shape or configuration to the previous electrode but of a slightly different size. This is because the machining speed is high during the coarse or primary machining operation but the surface of the workpiece to be machined is coarse, while the machining speed is low during the finish machining operation but the surface of the workpiece to be finished is fine and yet the machining side gap between the electrode and the workpiece should be narrow in the finish machining operation.

Accordingly, there have been proposed discharge machining method and apparatus as described below for the purpose of both coarsely and finish machining a workpiece with only one machining electrode. That is, in such discharge machining, after a workpiece is coarsely or primarily machined, a secondary machining feed in a direction substantially perpendicular to the coarse or primary machining direction, for example, a circular motion, is imparted to the electrode or the workpiece, and the workpiece is finish machined with the same machining electrode as that used in the coarse or primary machining operation similarly to the effect that a machining electrode which has a larger apparent size is employed. One example of such discharge machining apparatus shown in FIG. 1.

In FIG. 1, a machining electrode 10 confronts a workpiece 12 in a machining insulating solution. A pulse current supplied from a pulse current supply source 14 is fed through a machining gap between the electrode and the workpiece, and the workpiece 12 is thereby machined by an electric discharge therebetween. At this time a voltage Vd corresponding to the voltage across the machining gap and a reference voltage Vs are applied to a voltage differential circuit 16, which in turn produces a differential voltage output Vd−Vs. This voltage output Vd−Vs is sequentially applied to an amplifier 18, which amplifies the differential voltage Vd−Vs from the differential circuit 16 and produces an amplified differential voltage Vd−Vs to the hydraulic servo valve 20, thereby controlling the servo valve 20 in accordance with the differential voltage Vd−Vs. Thus, a hydraulic cylinder 22 is controlled by the servo valve 20 and in turn controls the electrode 10 mounted through X-Y intersection tables 30 and 32 and a piston rod in a servo mechanism so that the voltage Vd may coincide with the reference voltage Vs and accordingly the electrode 10 is moved relative to the workpiece 12 in a main machining direction or in Z-axis direction. The voltage differential circuit 16 and the amplifier 18 form a servo circuit, and the hydraulic servo valve 20 and the hydraulic cylinder 22 form a servo mechanism.

After the workpiece 12 is machined coarsely or primarily to the depth set slightly before the final predetermined depth by the electrode 10 and the coarse or primary machining step is thus finished, the pulse current supply source 14 is switched to produce a pulse output having smaller energy per pulse. Further, an electrode movement control device 24 produces output signals to both servo motors 26 and 28 in an ordinary method. The servo motors 26 and 28 thus operated move the X-Y intersection tables 30 and 32 in X-axis and Y-axis directions, respectively, thereby imparting a circular motion and thus finish machining the workpiece with the electrode 10. In this case, to the servo motors 26 and 28 are applied sine wave voltages having different phases of $\pi/2$ and amplitudes corresponding to the side gaps between the electrode and the workpiece for the coarse or primary machining and the finish machining. Thus, the workpiece 12 is subsequently machined again in a desired predetermined depth while the electrode 10 is moved relative to the workpiece 12 in a circular motion. Since the electrode 10 is so moved relative to the workpiece 12 as to be in size corresponding to the diameter of the relative circular motion or with the diameter in size corresponding thereto as increased in an equivalent effect, the coarsely machined surface of the workpiece 12 in a primary step can be removed to be finish machined.

In the case where a workpiece 12 is machined to form a hole, as shown in FIG. 2, corresponding to a machining electrode 10 having an elliptical cross section shown with the electrode 10 in such discharge machining method and apparatus, the amount of the workpiece 10 to be removed at the portion of the locus of the electrode 10 moved in a circular motion is much larger than the portion having a smaller radius of curvature with the electrode 10 having a larger radius of curvature. Accordingly, as the workpiece 12 is proceeded in machining, the depth of the hole machined in the workpiece 12 of the portion having larger radius of curvature becomes much different as shown in FIG. 3 from the depth of the hole machined in the workpiece of the portion having smaller radius of curvature. Therefore, if a deep hole is machined in the workpiece by the discharge machining method and apparatus, the primarily coarsely machined surface cannot be sufficiently removed in the workpiece in the secondarily finish machining step, and the depth of the electrode 10 reaching in the workpiece in the finish machining becomes much different from the depth of the hole thus formed in accordance with the shape or configuration of the electrode as serious disadvantage.

There has been proposed, for the purpose of eliminating the aforementioned disadvantage of the conventional discharge machining method and apparatus, another discharge machining apparatus employing a following discharge machining method. FIG. 4 is an explanatory diagram of the principle of such discharge machining apparatus. It is evident that the cause of the disadvantage pointed out above in the discharge machining as indicated in FIG. 2 depends upon the difference in the machining margins in the X-Y plane with respect to the Z-axis. If the radii of the circular motion imparted to the X-Y intersection tables 30 and 32 are not initially set to the amounts corresponding to predetermined machining margins so as to solve the disadvantage but are gradually increased from zero, the electrode is initially disposed at the deepest position even in any deep machining and is moved in expanded manner from this state. As a consequence, the difference in the radius of curvature shown in FIG. 3 cannot occur. More specifically, the spiral circle indicated in FIG. 4 shows a diagram indicating the locus of the relative movement between the electrode 10 and the workpiece 12 according to this discharge machining method and illustrating the increased machining margin at every circular motion by ΔR.

If the increased machining margin ΔR is set to extremely small value, the machining extent at every circular motion of the machining electrode becomes extremely small so that the machining energy is sufficiently afforded for uniform machining of the workpiece with the electrode. However, such an allowance of the machining energy of the electrode in turn corresponds to the machining operation of the electrode for the workpiece with less machining capacity with the resultant long machining time and the decreased machining efficiency. If the machining extent ΔR of the electrode is increased to prevent this drawback, the machining margin of the workpiece is increased with the resultant increased machining extent in the workpiece with more than the machining capacity of the electrode and accordingly causes disadvantageous difference in the depths in the workpiece as indicated in FIG. 3. Accordingly, it is always necessary to adjust the increased machining extent of the workpiece in response to the machining state of the electrode.

In such a discharge machining operation, machining chip and sludge exhausting action utilizing the increase and decrease in the machining gap between the electrode and the workpiece with the circular motion of the electrode relative to the workpiece is expected, and it is accordingly necessary to hasten the exhaust of machining chips and sludge by increasing the width in the increase of the machining gap between the electrode and the workpiece and accelerating the circular motion of the electrode relative to the workpiece when the machining state is deteriorated due to the shortcircuit or a like. However, if the circular motion of the electrode relative to the workpiece is further increased, the discharge machining apparatus does not follow a control system thereby deteriorating the machining accuracy of the electrode at the workpiece. This cannot allow simple increase of the circular motion of the machining electrode.

Further, in FIG. 4, the increase simply in the machining margin ΔR in case of deep hole machining operation allows preferable machining with small machining margin, but causes, in case of large machining margin, a problem pointed out above with reference to FIG. 3 and induces a phenomenon that the electrode 10 is raised in the state to rub off the workpiece 12 while shortcircuit occurs between the electrode 10 and the workpiece 12.

Since the discharge machining electrode 10 is generally formed of a material being feasibly scratched such as copper or graphite, the electrode 10 is always scratched when the abovedescribed phenomenon occurs. Accordingly, it is preferred that, when the width of the machining gap between the electrode 10 and the workpiece 12 is narrow, the circulating speed of the electrode 10 is decelerated thereby securing a time while the electrode 10 may sufficiently escape upwardly in this case, while when the width of the machining gap therebetween is wide, the circulating speed of the electrode 10 is accelerated so as to readily exhaust the machining chips and sludge existing in the gap. It is necessary in the case where a shortcircuit or an abnormal electric discharge occur between the electrode 10 and the workpiece 12 to reduce the radius of the circulating electrode and to thereby accelerate the circulating speed of the electrode so as to exhaust the machining chips and sludge in the machining gap. However, the conventional discharge machining apparatus cannot control such a complicated operation.

Moreover, the worst drawback in the conventional discharge machining exists in the consumption of the machining electrode 10. FIGS. 5A through 5C illustrate examples of the drawbacks existing in the conventional discharge machining. If the degree of expanding the radius of the circular motion of the machining electrode 10 relative to the workpiece 12 is increased like in a deep hole machining operation, a shortcircuit will occur as indicated in FIG. 5A between the side surface of the electrode 10 and the workpiece 12. When such a shortcircuit heretofore occurs between the electrode 10 and the workpiece 12, the electrode 10 is raised as indicated in FIG. 5B along a direction of primary machining feeding and accordingly Z-axis direction, and after the shortcircuit state is eliminated, the electrode 10 is lowered as indicated in FIG. 5C while machining the workpiece 12. Since an electric discharge occurs at the end of the electrode 10 at this time, the machining operation is executed only at the end of the electrode 10, and the electrode 10 is accordingly locally consumed at the end thereof, with the result that the machining accuracy of the workpiece 12 becomes worse.

SUMMARY OF THE INVENTION

Accordingly, an object of the present invention is to provide a fabricating machine in which all the above-described difficulties and drawbacks can be eliminated, and a preferable finish machining can be performed with a sufficient machining efficiency by optimally controlling the increased machining margin ΔR of the electrode at every circular motion of the electrode in response to the machining capacity when a machining tool or a machining electrode is moved in a circular motion relative to a workpiece.

Another object of the invention is to provide a fabricating machine in which a workpiece can be efficiently machined by optimally controlling the increased machining margin ΔR of the electrode at every circular motion of the electrode in response to the machined state of the workpiece under the suitable control of the width of the machining gap in response to the machining state when a machining tool or a machining electrode is moved in a circular motion relative to the workpiece, and machining chips, sludge or the like can be effectively exhausted without adversely affecting the machining accuracy thereof when the machining state deteriorates.

A further object of the invention is to provide a fabricating machine in which a machining tool or a machining electrode is moved substantially in a circular motion relative to a workpiece for machining the workpiece while gradually expanding or reducing the moving path or route of the electrode so that the expansion of the electrode in the moving path or the reduction of the electrode in the moving path and the acceleration or deceleration of the circular motion of the electrode can be optimally controlled in response to the machining state of the workpiece.

A still further object of the invention is to provide a discharge machining method by which a finish machining to be executed subsequently to a primary or main machining operation can be efficiently performed, and the local consumption of a machining electrode is prevented thereby eliminating a shortcircuit between the electrode and a workpiece and enabling preferable retention of machining accuracy even if a deteriorated machining state such as a shortcircuit therebetween or the like occurs in the course of the finish machining operation.

A particular object of the invention is to provide a discharge machining apparatus which can readily achieve the foregoing method and objects of the invention.

These, as well as other objects of the invention, are met by a fabricating machine in which a machining tool or a machining electrode is moved in a circular motion relative to a workpiece for machining the workpiece while gradually expanding or reducing the moving path of the tool or the electrode in a predetermined amount including discriminating means for determining whether the machining tool or the machining electrode is in a machining enabling state or in a machining disabling state for the workpiece while the tool or the electrode is moving in a circular motion, and tool or electrode moving path deciding means for expanding or reducing the moving path of the tool or the electrode on the basis of smaller set value of at least two set values of the expanding or reducing amount of the moving path of the tool or the electrode when at least two set values of the expanding or reducing amount of the moving path of the tool or the electrode are set and said discriminating means determines the machining enabling state and for expanding or reducing the moving path of the tool or the electrode on the basis of larger set value of the two set values when said discriminating means determines the machining disabling state.

These as well as other objects of the invention are met by a fabricating machine in which a machining tool or a machining electrode is moved substantially in a circular motion relative to a workpiece for machining the workpiece while gradually expanding or reducing the moving path of the electrode in a predetermined amount under the control of the width of a machining gap between the electrode and the workpiece. The machine includes discriminating means for detecting whether the machining tool or the machining electrode is in a machining enabling state, a machining disabling state or a deteriorated machining state for the workpiece while the tool or the electrode is moving in a circular motion; tool or electrode moving path deciding means for selecting a smaller reduced value of at least two reduced widths of the machining gap when at least two reduced widths of the machining gap are set and at least one expanded width of the machining gap is set as well as said discriminating means detects the machining enabling state, selecting larger reduced value of the two reduced widths of the machining gap when said discriminating means detects the machining disabling state and selecting the expanded value or width of the machining gap when said discriminating means detects the deteriorated machining state to thereby control the expansion or reduction of the moving path of the tool or the electrode; and circular motion speed deciding means for selecting faster circular motion speed of the tool or the electrode when at least two circular motion speeds are set and said discriminating means detects the deteriorated machining state and selecting slower circular motion speed of the tool or the electrode when said discriminating means detects other than the deteriorated machining state to thereby control the circular motion of the tool or the electrode.

The above as well as other objects of the invention are met by a fabricating machine in which a machining tool or a machining electrode is moved substantially in a circular motion relative to a workpiece for machining the workpiece while gradually expanding or reducing the moving path of the tool or the electrodes. The machine includes: discriminating means for detecting the width of the machining gap between the tool or the electrode and the workpiece and the machining state of the tool or the electrode while the tool or the electrode is moving in a circular motion; tool or electrode moving path deciding means for expanding or reducing the moving path of the tool or the electrode in a direction for reducing the width of the machining gap between the tool or the electrode and the workpiece on the basis of the machining state detected by said discriminating means and expanding or reducing the moving path of the tool or the electrode in a direction for increasing the width of the machining gap when the width of the machining gap detected by said discriminating means becomes extraordinarily narrow; and circular motion speed deciding means for controlling the circular motion speed of the tool or the electrode on the basis of the width of the machining gap between the tool or the electrode and the workpiece detected by said discriminating means and increasing the width of the machining gap and subsequently accelerating the circular motion speed of the tool or the electrode when the width of the machining gap detected by said discriminating means becomes extraordinarily narrow.

The above as well as other objects of the invention are further met by a discharge machining method for machining a workpiece by applying electric current to the workpiece and an electrode through a machining solution in the machining gap between the workpiece and the electrode, moving the electrode and the workpiece relative to each other in a primary or main machining direction, subsequently controlling the machining gap in an electric discharge enabling state along a plane substantially perpendicular to the primary machining direction and finish machining the workpiece for moving the electrode relative to the workpiece substantially in a circular motion including the steps of gradually expanding or reducing the radius of the circular motion of the electrode in a direction for reducing the machining gap between the electrode and the workpiece when the machining state between the electrode and the workpiece is preferable and abruptly expanding or reducing the radius of the circular motion of the electrode in a direction for increasing the machining gap therebetween along a plane substantially perpendicular to the main machining direction while stopping the circular motion of the electrode when the machining state between the electrode and the workpiece becomes deteriorated.

Also, the above as well as other objects of the invention are met by a discharge machining apparatus for machining a workpiece by applying electric current to the machining gap between the workpiece and the electrode, moving the electrode and the workpiece relative to each other in a primary or main machining direction, subsequently controlling the machining gap in an electric discharge enabling state along a plane substantially perpendicular to the primary machining direction and finish machining the workpiece for moving the electrode relative to the workpiece substantially in a circular motion including discriminating means for detecting whether the machining state of the workpiece by the electrode in a finish machining step is in a machining enabling state, in a machining disabling state or in a deteriorated machining state; and circular motion moving path deciding means for gradually expanding or reducing the radius of the circular motion of the electrode by selecting smaller set value of at least two set expanded or reduced values of the radius of the circular motion of the electrode when at least two set expanded or reduced values of the radius of the circular motion of the electrode are set for reducing the machining gap between the electrode and the workpiece and said discriminating means detects the machining enabling state and selecting the larger set value of the two set expanded or reduced values thereof when said discriminating means detects the machining disabling state, gradually expanding or reducing the radius of the circular motion of the electrode on the basie of the set value when at least one expanded or reduced value of the radius of the circular motion of the electrode is set for increasing the machining gap therebetween and said discriminating means detects the deteriorated machining state, and abruptly expanding or reducing the radius of the circular motion of the electrode in a direction for increasing the machining gap therebetween along a plane substantially perpendicular to the primary or main machining direction while stopping the circular motion of the electrode when the deteriorated machining state is continuously detected for a predetermined time.

DESCRIPTION OF THE PREFERRED EMBODIMENTS

Figure 1:
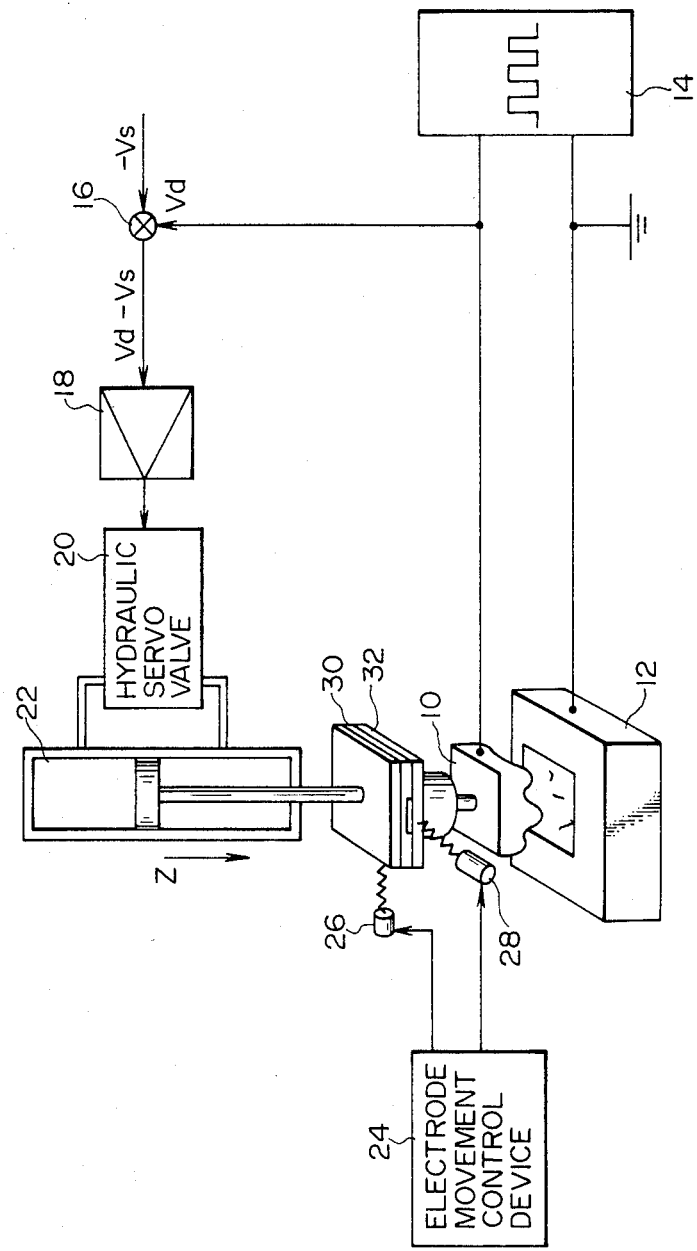
FIG. 1 is an explanatory diagram showing conventional a discharge machining method and apparatus in which an electrode is displaced relative to a workpiece.
Figure 2:
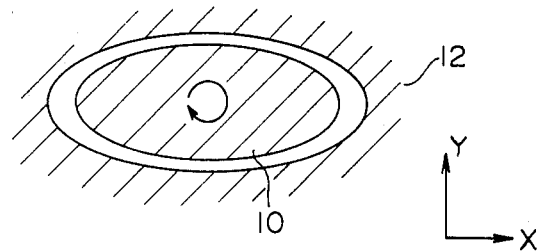
FIG. 2 is an explanatory diagram showing one example of the electrode structure of the conventional discharge machining apparatus.
Figure 3:
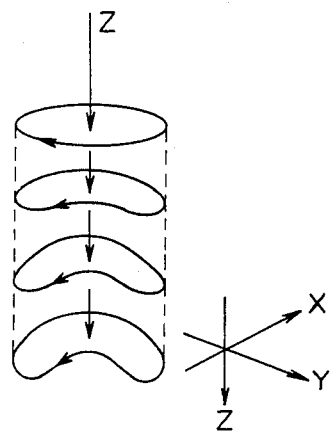
FIG. 3 is an explanatory diagram showing the disadvantageous state of the electrode shown in FIG. 2.

A first preferred embodiment of a fabricating machine such as a discharge machining apparatus constructed according to the present invention will be described with reference to drawings, particularly to FIG. 6, wherein like reference numerals designate equivalent or the same components and parts in the conventional discharge machining apparatus shown in the previous diagrams, and the description thereof will be omitted.

Figure 6:
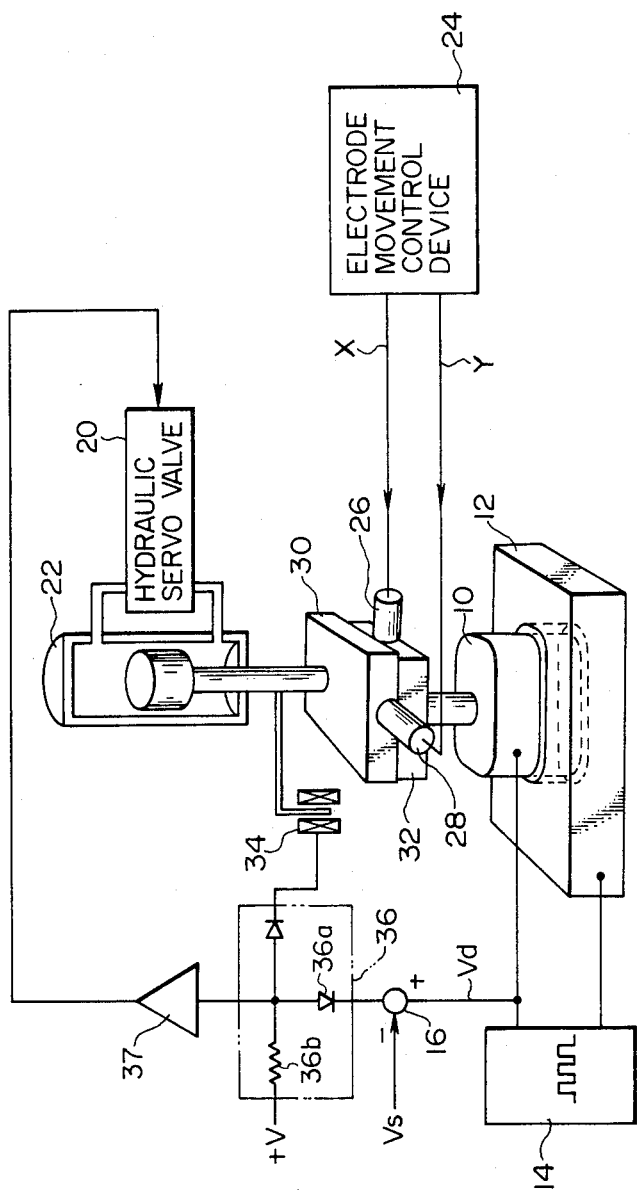
FIG. 6 is an explanatory diagram showing one preferred embodiment of discharge machining method and apparatus according to the invention.

FIG. 6 shows a preferred embodiment of the discharge machining apparatus constructed according to the invention. In FIG. 6, signals from an electrode movement control device 24 are applied to servo motors 26 and 28, respectively, which are thereby driven, and the servo motors 26 and 28 thus driven move in turn X-Y intersection tables 30 and 32, respectively in X-axis and Y-axis directions, respectively, thereby imparting relatively a circular motion between an electrode 10 and a workpiece 12 in the same manner as the conventional discharge machining apparatus shown in FIG. 1.

This discharge machining apparatus includes a differential transformer 34, which has a coil or winding section fixed to the stationary side of the apparatus and a movable iron core constructed and arranged to move similarly to the movement of the electrode 10 for thereby detecting the height or the position of the electrode 10 in Z-axis direction.

The discharge machining apparatus also includes a comparison selector circuit 36, which is similar to a circuit 12 in FIG. 1 of Japanese Patent Publication No. 32112/1978. The comparison selector circuit 36 serves to preferentially select the lower voltage of the differential voltage Vd−Vs, between the voltage Vd of the machining gap between the workpiece 12 and the electrode 10 and a reference voltage and the output voltage of the transformer 34, to apply the differential voltage Vd−Vs through a diode 36a to an amplifier 37 when the differential voltage Vd−Vs is plus or positive and to apply the differential voltage Vd−Vs through a resistor 36b to the amplifier 37 when the differential voltage Vd−Vs is minus or negative. Since the differential voltage Vd−Vs becomes negative only when the voltage Vd is decreased due to a shortcircuit between the electrode 10 and the workpiece 12 or the like, the reference voltage Vs is suitably set, thereby suppressing the minus or negative component of the differential voltage Vd−Vs to low value. In this manner, in an ordinary machining operation the electrode 10 is lowered under control at a predetermined speed, and if a shortcircuit occurs, the electrode 10 is raised at an extremely slow speed.

The comparison selector circuit 36 is operated, as described in detail in the aforementioned Japanese Patent Publication No. 32112/78, to control the position of the electrode 10 in accordance with the differential voltage Vd−Vs between the voltage Vd of the machining gap between the electrode 10 and the workpiece 12 and the reference voltage Vs in the case where the electrode 10 is located higher than a set position when the position of the coil section of the differential transformer 34 fixed to the stationary side of the apparatus is predetermined beforehand, and to preferentially select the output of the differential transformer 34 when the electrode 10 is lowered to the predetermined set position. The electrode 10 is so controlled as not to move downwardly lower than the set position by a servo mechanism which includes the servo valve 20 and the hydraulic cylinder 22.

Figure 7:
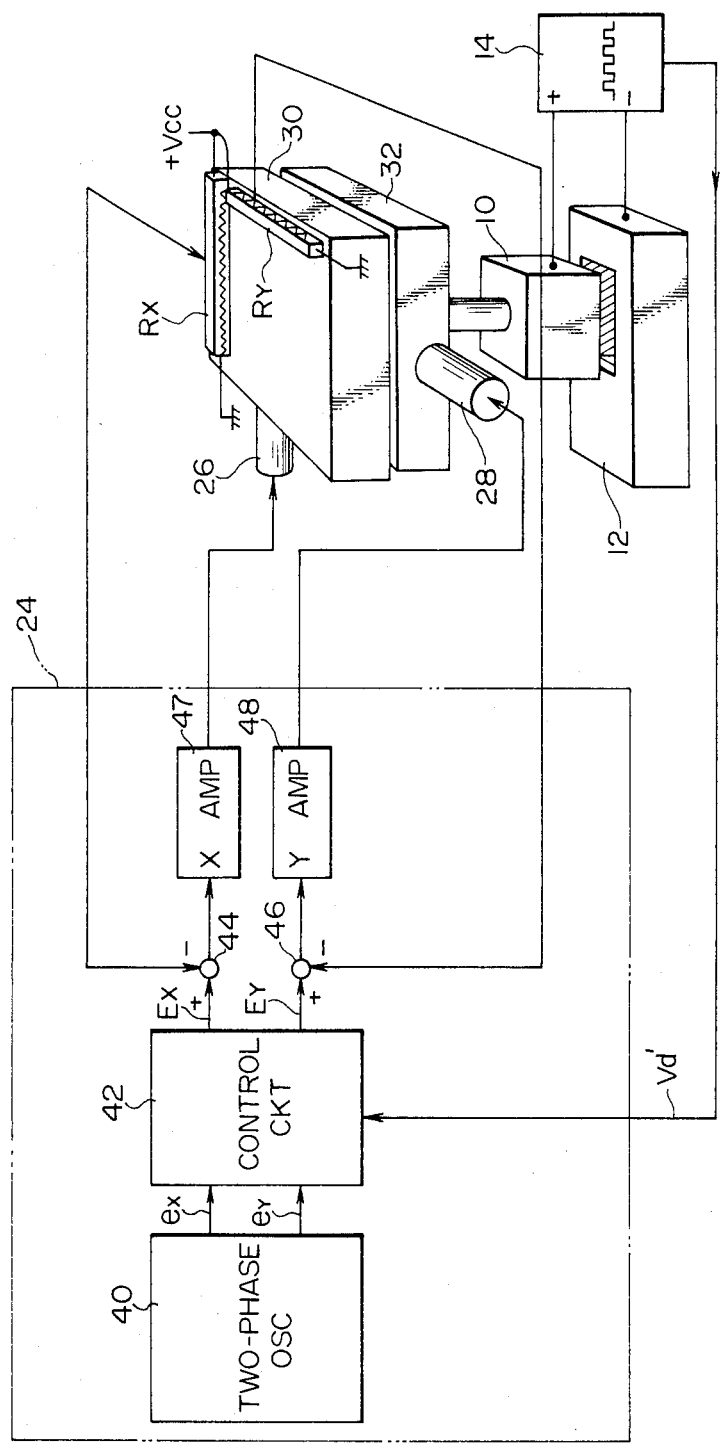
FIG. 7 is an explanatory diagram showing the control device of the X-Y intersection table employed in the discharge machining apparatus of the invention.

FIG. 7 shows an explanatory diagram of the electrode movement control device 24 of the X-Y intersection tables 30 and 32. In FIG. 7, the control device 24 includes a two-phase oscillator 40 for producing sine waves $e_x$ and $e_y$ having a different phase of 90°, a control circuit 42 which controls the outputs $e_x$ and $e_y$ from the two-phase oscillator 40 in accordance with an interelectrode voltage detection signal Vd' from the pulse current supply source 14 and produces voltage outputs $E_x$ and $E_y$ corresponding to desired eccentric radii, addition points 44 and 46 for adding the voltage outputs $E_x$ and $E_y$ from the control circuits 42 and the output voltages from linear potentiometers $R_x$ and $R_y$ mounted on the X-Y intersection tables 30 and 32, respectively, for detecting the position of the electrode 10 in an X-Y plane, and amplifiers 47 and 48 for amplifying the outputs from the addition points 44 and 46, respectively, and producing motor drive outputs to X-axis and Y-axis motors 26 and 28, respectively, thereby driving the motors 26 and 28. Since the output voltages of the potentiometers $R_x$ and $R_y$ are fed back to the addition points 44 and 46, the motors 26 and 28 are driven until the outputs from the addition points 44 and 46 become "0", thereby controlling the position of the table so as to become equal to the outputs $E_x$ and $E_y$, respectively of the control circuits 42.

Figure 8:
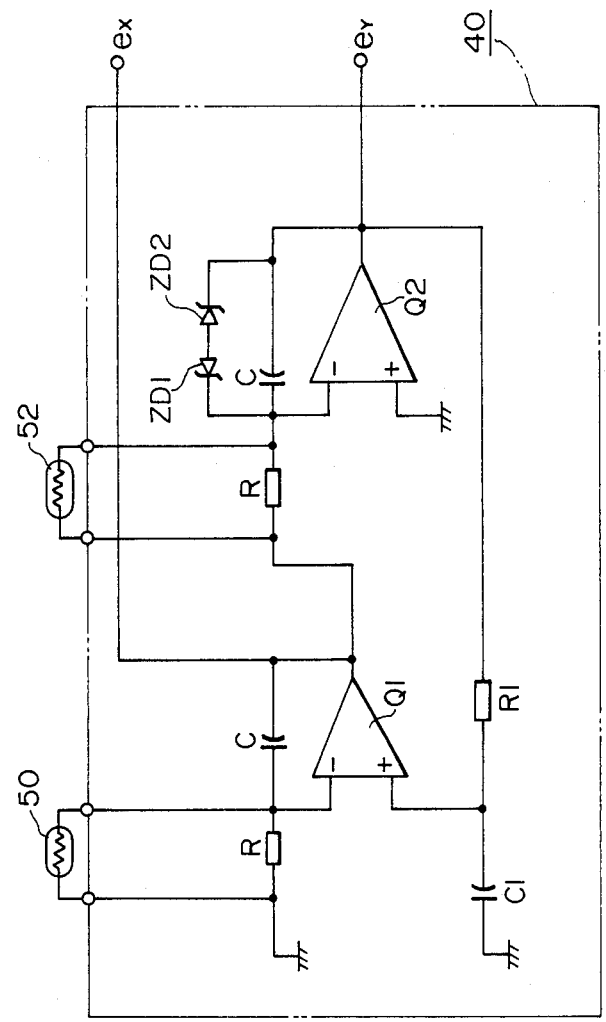
FIG. 8 is a circuit diagram of the two-phase oscillator employed in the control device.

FIG. 8 illustrates the detailed explanatory diagram of the two-phase oscillator 40 in the control device 24. The two-phase oscillator 40 includes an integrating circuit which has an operational amplifier Q1, a resistor R connected between the inverting input terminal of the amplifier Q1 and ground, and a capacitor C connected between the output and the inverting input terminal of the amplifier Q1; a limiting inversion integrating circuit which has an operational amplifier Q2, a resistor R connected between the output of the operational amplifier Q1 and the inverting input terminal of the amplifier Q2, a capacitor C connected between the output and the inverting input terminal of the amplifier Q2, and voltage limiting zener diodes ZD1 and ZD2 connected in reverse series with one another and also connected in parallel with the capacitor C, in such a manner that the integrating circuit is connected in cascade with the inversion integrating circuit in a feedback loop described in the following differential equations:

$$RC(d/dt)e_x = e_y \quad (1)$$

$$RC(d/dt)e_y = e_x \quad (2)$$

where in the circuit the time constant R1·C1 is intentionally increased larger than the RC, thereby slightly forming the circuit unstable. The voltage limiting zener diodes ZD1 and ZD2 serve to eliminate the deformation of the waveforms of the $e_x$ and $e_y$ and to thereby stabilize the amplitude thereof. The two outputs $e_x$ and $e_y$ thus obtained have different phase of 90° as will be expressed by the following equations:

$$e_x = E \sin (t/RC) \quad (3)$$

$$e_y = E \cos (t/RC) \quad (4)$$

where E represents the voltage at the voltage limiting zener diodes ZD1 and ZD2. In the circuit external terminals are connected at both ends of the resistors R for setting the frequency in the integrating circuits. External resistors 50 and 52 are respectively connected to the terminals. The frequency of the external circuit can be controlled by setting and controlling the resistance values of the external resistors 50 and 52.

In this embodiment, photoconductive cells are employed for the external resistors 50 and 52, thereby controlling the frequency of the external circuit in accordance with the external light irradiated thereto.

Figure 9:
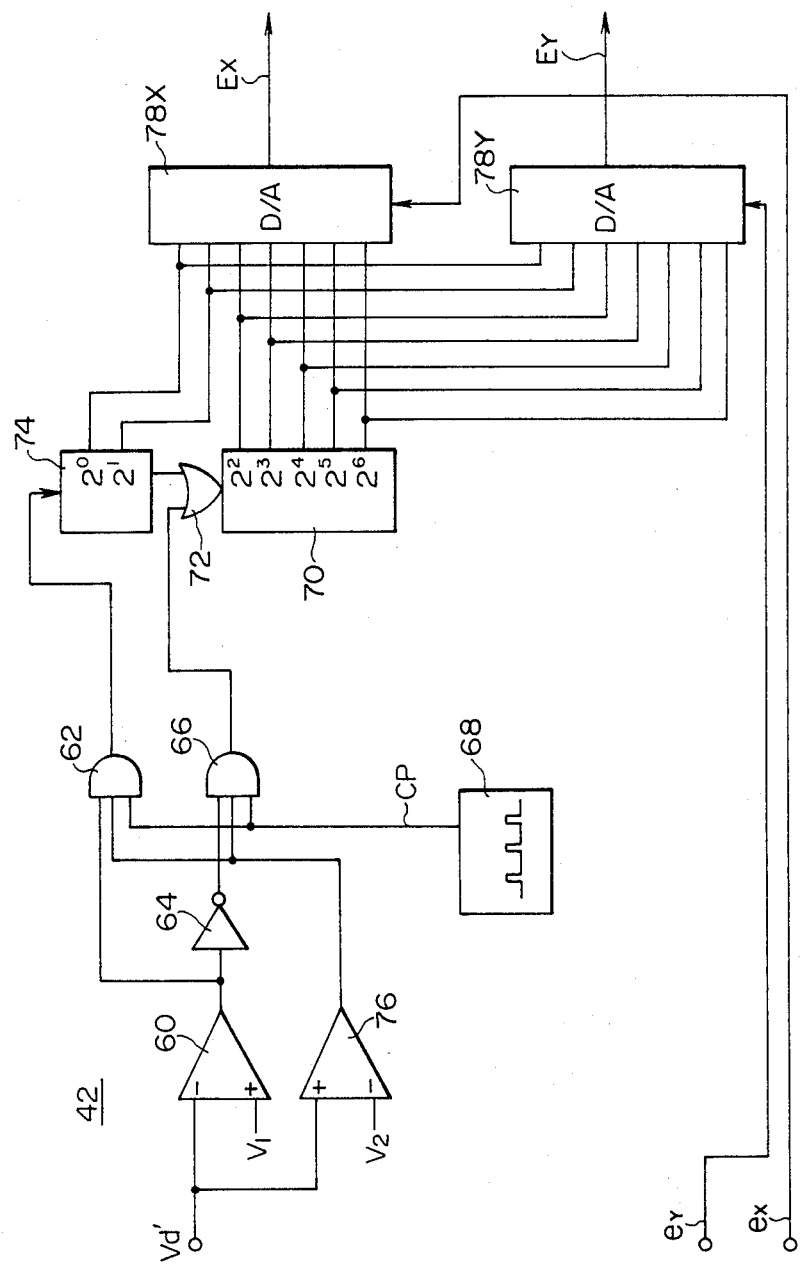
FIG. 9 is a circuit diagram showing the control circuit for the two-phase oscillator.

FIG. 9 shows one preferred example of the control circuit 42 in the control device 24 in a circuit diagram. In general, while a discharge machining is carried out preferably between the electrode 10 and the workpiece 12, an interelectrode voltage detection signal Vd' falls within a predetermined range. As the discharge machining gap becomes larger, the interelectrode voltage detection signal Vd' becomes higher. If the discharge machining gap becomes larger than a predetermined length or value, a preferable discharge can be disabled. The interelectrode voltage detection signal at this time is defined as a machining enabling voltage V1. If a shortcircuit between the electrode and the workpiece occurs in the course of the discharge machining, the interelectrode voltage detection signal Vd' is lowered and becomes lower than a predetermined voltage or value. The interelectrode voltage detection signal at this time is defined as a shortcircuit detection voltage V2. When the machining enabling voltage V1 and the shortcircuit detection voltage V2 are predetermined and are compared with the interelectrode voltage detection voltage Vd', it can discriminate whether the discharge machining operation is suitably conducted or not.

The interelectrode voltage detection signal Vd' is applied to the inverting input terminal of a comparator 60, and the machining enabling voltage V1 is applied to non-inverting input terminal of the comparator 60, which serves to compare the detection signal Vd' with the machining enabling voltage V1. If the interelectrode voltage detection signal Vd' is higher than the machining enabling voltage V1, the machining gap length between the electrode 10 and the workpiece 12 is discriminated as being in the machining disabling state since the machining gap length is expanded to the extent that a discharge cannot be conducted between the electrode 10 and the workpiece 12. In this state, the comparator 60 will in turn produce a logic level "0", which is sequentially applied to one input of an AND gate 62, thereby closing the AND gate 62. The logic level "0" from the comparator 60 is also applied through an inverter 64 to one input of an AND gate 66, thereby opening the AND gate 66.

A clock pulse CP at every predetermined time from an oscillator 68 or a clock pulse CP synchronized with the oscillation period of the output of the two-phase oscillator 40 (in FIG. 7) is applied to another input terminals of both the AND gates 62 and 66. Thus, when the AND gate 66 is opened in the machining disabling state as described above, the clock pulse CP from the oscillator 68 is fed through an OR gate 72 to a first counter 70, which sequentially counts the clock pulses CP from the oscillator 68 therethrough.

When the interelectrode voltage detection signal Vd' is lower than the machining enabling voltage V1, the machining gap length between the electrode 10 and the workpiece 12 is discriminated as being sufficiently in the machining enabling state since the machining gap length is expanded to the extent that a discharge can be conducted between the electrode 10 and the workpiece 12. In this state, the comparator 60 will in turn produce a logic level "1", which is sequentially applied to the one input of the AND gate 62, thereby opening the AND gate 62. The logic level "1" from the comparator 62 is also applied through the inverter 64 to the one input of the AND gate 66, thereby closing the AND gate 66.

Since the clock pulses CP from the oscillator 68 are applied to the another input terminals of both the AND gates 62 and 66, when the AND gate 62 is thus opened in the machining enabling state as described above, the clock pulses CP from the oscillator 68 are fed to a second counter 74, which sequentially counts the clock pulses CP from the oscillator 68 therethrough. The counters 70 and 74 are connected in cascase. Thus, the counted output in the counter 74 is further counted in the counter 70.

The interelectrode voltage detection signal Vd' is also applied to the non-inverting input terminal of a comparator 76, and the shortcircuit detection signal V2 is applied to the inverting input terminal of the comparator 76, which serves to compare the detection signal Vd' with the shortcircuit detection voltage V2. If the interelectrode voltage detection signal Vd' is lower than the shortcircuit detection voltage V2, it is discriminated as being occurred a shortcircuit between the electrode 10 and the workpiece 12. In this state, the comparator 76 will in turn produce a logic level "0", which is sequentially applied to the other inputs of the AND gates 62 and 66, thereby closing both the AND gates 62 and 66. Accordingly, the clock pulse CP from the oscillator 68 is not fed therethrough to the counters 70 and 74, respectively. Thus, the counted values in the counters 70 and 74 are not increased. As described above, discriminating means or device for determining whether the electrode 10 is in machining enabling state or in machining disabling state for the workpiece 12 is thus constructed.

The counted outputs from the respective counters 70 and 74 are inputted to both multiplication type D/A converters 78X and 78Y, and the outputs $e_x$ and $e_y$ from the two-phase oscillator 40 (in FIG. 7) are also applied to the D/A converters 78X and 78Y, respectively, which sequentially serve to multiply the counted outputs from the counters 70 and 74 by the outputs $e_x$ and $e_y$ from the oscillators 40 and to produce the multiplied values $E_x$ and $E_y$ in analog values or amounts. The multiplication type D/A converters of this type may include, for example, a type No. AD7520 manufactured by Analog Device Inc.

With the above-described construction, the peak values of the outputs $E_x$ and $E_y$ from the multiplication type D/A converters 78X and 78Y are slightly increased at every one unit upon inputting of the clock pulse CP thereinto in the machining enabling state, and are largely increased at every four units upon inputting of the clock pulses CP thereinto in the machining disabling stage that the length of the machining gap between the electrode 10 and the workpiece 12 is increased widely. If a shortcircuit state is detected, the peak values of the outputs $E_x$ and $E_y$ from the D/A converters 78X and 78Y are not increased since the clock pulses CP from the oscillator 68 are not fed through the closed AND gates 62 and 66 to the counters 74 and 70. As described above, the multiplication type D/A converters 78X and 78Y serve to operate as machining electrode moving path deciding means or device together with the counters 70 and 74.

The operation of the fabricating machine such as, the preferred embodiment of the discharge machining apparatus thus constructed according to the invention will be described in the example of forming a hole at the workpiece 12 using the machining electrode 10.

The servo mechanism which includes the servo valve 20 and the hydraulic cylinder 22 is so driven as to vertically downwardly move the electrode 10 relative to the workpiece 12 at a predetermined machining position, thereby commencing a coarsely or primary machining step. In this step, the servo mechanism is controlled so that the machining voltage Vd between the electrode 10 and the workpiece 12 falls within the range for always conducting a preferable discharge machining operation.

In the case where the machining voltage Vd between the electrode 10 and the workpiece 12 is lowered to thereby cause a danger of a shortcircuit or the like between the electrode 10 and the workpiece 12, the machining voltage Vd to be applied to the comparison selector circuit 36 is accordingly lowered, referring back to FIG. 6, the differential voltage Vd−Vs obtained through the voltage differential circuit 16, the comparison selector circuit 36 and the amplifier 37 and inputted to the hydraulic servo valve 20 is consequently lowered. Thus, the lowering speed of the electrode 10 is decelerated and the machining gap between the electrode 10 and the workpiece 12 is resultantly increased widely, thereby eliminating a shortcircuit between the electrode 10 and the workpiece 12. Thus, the electrode 10 is controlled to the extent for preferably conducting the discharge machining operation with the electrode 10.

If the shortcircuit between the electrode 10 and the workpiece 12 is thus eliminated, the machining voltage Vd is raised back to a value capable of suitably conducting a discharge machining operation. As a consequence, the lowering speed of the electrode 10 is again accelerated.

In the case where the machining gap between the electrode 10 and the workpiece 12 is increased excessively due to a certain reason to the extent that a discharge between between the electrode 10 and the workpiece 12 is disabled, the machining voltage Vd is raised, referring back to FIG. 6, the differential voltage Vd−Vs obtained through the voltage differential circuit 16 and inputted through the comparison selector circuit 36 and the amplifier 37 to the hydraulic servo valve 20 is consequently raised. Thus, the lowering speed of the electrode 10 is accelerated and the machining gap between the electrode 10 and the workpiece 12 is resultantly decreased. Thus, the electrode 10 is controlled to the extent for preferably commencing the discharge machining operation in the machining gap therebetween.

When the preferable discharge machining operation is thus commenced between the electrode 10 and the workpiece 12, the machining voltage Vd is lowered, and the lowering speed of the electrode 10 is decelerated. In this manner, the machining gap between the electrode 10 and the workpiece 12 is always maintained in an optimum state while advancing the discharge machining operating between the electrode 10 and the workpiece 12. When the electrode 10 reaches a predetermined depth in the workpiece 12, the differential transformer 34 (in FIG. 6) will detect it.

Thus, the output of the differential transformer 34 becomes lower than the differential voltage $Vd-Vs$ obtained through the voltage differential circuit 16, and the comparison selector circuit 36 will preferentially select the lower voltage of the differential voltage $Vd-Vs$ and the output voltage of the differential transformer 34 and accordingly the lowered output of the transformer 34 and produces it as an output. Thus, the input voltage applied from the comparison selector circuit 36 through the amplifier 37 to the servo valve 20 becomes "0", thereby stopping the lowering movement of the electrode 10. As described above, the coarsely or primary machining step of the apparatus will be thus completed.

Figure 4:
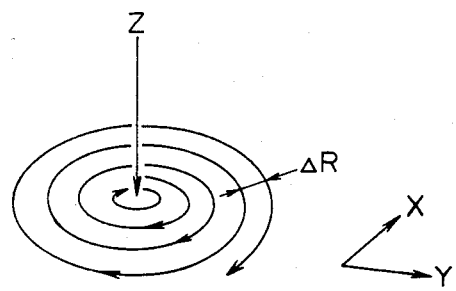
FIG. 4 is an explanatory view showing the locus of the electrode when a circular motion for automatically expanding the radius of moving electrode is imparted to the electrode.
Figure 5A:
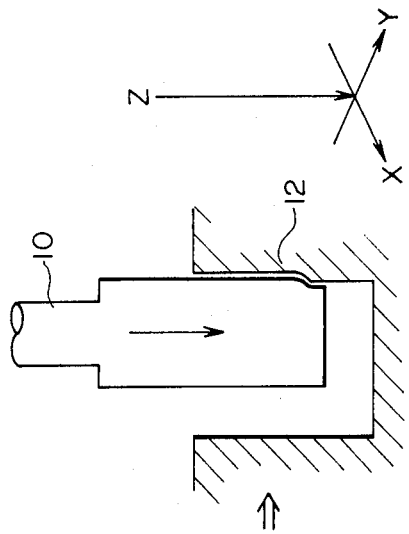
FIGS. 5A through 5C are explanatory views showing the movements of the electrode when a shortcircuit occurs between the electrode and the workpiece.
Figure 5B:
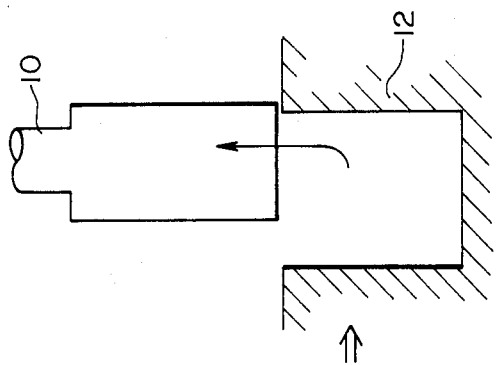
Figure 5C:
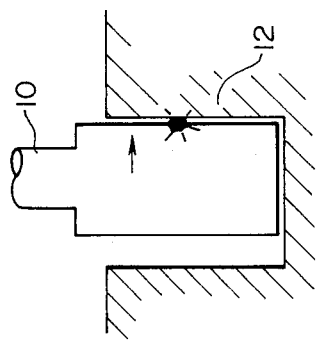

When the coarse or primary machining step is thus completed, the energy per pulse of the pulse current supply source 14 (in FIG. 6) is lowered, and a finish or secondary machining step for imparting continuous circular motion to the X-Y intersection tables 30 and 32 from the electrode movement control device 24 is simultaneously commenced. The radii of the circular motion imparted to the X-Y intersection tables 30 and 32 are so controlled, as indicated in FIG. 4, as to be gradually increased from zero at a rate of increased machining margin $\Delta R$. The increased machining margin $\Delta R$ is so controlled that the machining efficiency of the apparatus may become at a maximum within the range of the machining capacity of the apparatus.

Sine waves $e_x$ and $e_y$ having a different phase of 90° are, referring back to FIG. 7, produced initially from the two-phase oscillator 40. The outputs $e_x$ and $e_y$ from the two-phase oscillator 40 are in turn applied to the multiplication type D/A converters 78X and 78Y in the control circuit 42, and are multiplied by the counted outputs from the counters 70 and 74, respectively. Thus, the converters 78X and 78Y will produce drive voltage outputs $E_x$ and $E_y$ for the servo motors 26 and 28, respectively. The radii of the circular motion of the X-Y intersection tables 30 and 32 and accordingly the radii of the circular motion of the electrode 10 relative to the workpiece 12 can be imparted by the voltage peak values of the outputs $E_x$ and $E_y$ from the converters 78X and 78Y.

With the above-described apparatus, the radius of the circular motion is gradually increased as below. When the finish or secondary machining step is commenced, the counters 70 and 74 produce outputs "0" and the multiplication type D/A converters 78X and 78Y will accordingly produce outputs $E_x$ and $E_y$ being "0". Consequently, the circular motion of the electrode 10 is commenced from the position where the radius of the circular motion is zero. If the machining voltage detection signal Vd' falls in the relationship of $V1>Vd'>V2$, the comparator 60 compares the detection signal Vd' with the machining enabling voltage V1 and produces a logic level "1" since the detection signal Vd' is lower than the machining enabling voltage V1. Further, the comparator 76 compares the detection signal Vd' with the shortcircuit detection voltage V2 and produces a logic level "1" since the detection signal Vd' is higher than the shortcircuit detection voltage V2. Thus, the high level outputs "1" from the comparators 60 and 76 are applied to the AND gate 62, thereby opening the AND gate 62. Thus, the clock pulses CP from the oscillator 68 are applied through the AND gate 62 to the counters 70 and 74, which in turn count the clock pulses CP from the oscillator 68 therethrough. Then, the counted outputs from the counters 70 and 74 are sequentially applied to both the multiplication type D/A converters 78X and 78Y, which sequentially increase the peak values of the outputs $E_x$ and $E_y$ therefrom at every one unit upon reception of the clock pulse CP thereto and accordingly increase the radii of the circular motion of the electrode 10 gradually at a rate of the increased machining margin $\Delta R1$.

If the interelectrode or machining voltage detection signal Vd' falls in the relationship of $Vd'>V1$, the comparators 60 compares the detection signal Vd' with the machining enabling voltage V1 and will produce a logic level "0" since the detection signal Vd' is higher than the machining enabling voltage V1, thereby discriminating the machining gap length between the electrode 10 and the workpiece 12 as being in the machining disabling state since the machining gap length is expanded excessively to the extent that a discharge cannot be preferably conducted between the electrode 10 and the workpiece 12. Then, the low level output "0" from the comparator 60 is in turn applied to the AND gate 62, thereby closing the AND gate 62, and is in turn applied through the inverter 64 to the AND gate 66, thereby opening the AND gate 66. Thus, the clock pulses CP from the oscillator 68 are fed directly through the AND gate 66 to the counter 70, which sequentially counts the clock pulses CP from the oscillator 68 directly.

As evident from FIG. 9, the counters 70 and 74 will count in the above-described state one clock pulse CP from the oscillator 68 at a rate four times as compared with the rate in the aforementioned machining enabling state of the apparatus. Accordingly, the multiplication type D/A converters 78X and 78Y receive the counted outputs increased by four times as compared with those in the machining enabling state from the counters 70 and 74 and increase the peak values of the outputs $E_x$ and $E_y$ therefrom by every four units upon inputting of the clock pulses CP from the oscillator 68 thereto, thereby gradually increasing the radii of the circular motion of the electrode 10 at the increased machining margin $\Delta R2$ ($\Delta R2=4\Delta R1$) multiplied by four as compared with that in the machining enabling state of the apparatus. In this manner, the machining gap between the electrode 10 and the workpiece 12 is abruptly narrowed to the range for enabling the discharge machining at the electrode 10 relative to the workpiece 12. When the electrode 10 will thus become in the machining enabling state, the machining voltage detection signal Vd' will fall again in the relationship of $V1>Vd'$, and the electrode 10 is switched to the aforementioned machining enabling state.

If a shortcircuit occurs between the electrode 10 and the workpiece 12 due to excessively narrow machining gap therebetween as an example, the machining voltage detection signal Vd' will fall in the relationship of V2>Vd', the comparator 76 compares the detection signal Vd' with the shortcircuit detection voltage V2 and will produce a logic level "0" since the detection signal Vd' is lower than the shortcircuit detection voltage V2. Thus, the low level output "0" from the comparator 76 is applied to the AND gates 62 and 66, thereby closing the AND gates 62 and 66 and thereby stopping counting of the clock pulses CP from the oscillator 68 at the counters 70 and 74. Since no clock pulse CP is applied through the closed AND gates 62 and 66 to the counters 74 and 70, no counted outputs from the counters 74 and 70 are applied from the counters 74 and 70 to the multiplication type D/A converters 78X and 78Y. Thus, the converters 78X and 78Y will temporarily stop increasing the peak values of the outputs $E_x$ and $E_y$ therefrom, thereby eliminating the increase in the radii of the circular motion of the electrode 10. When the shortcircuit thus occurred is naturally removed in this manner the machining voltage detection signal Vd' is returned to fall in the relationship of Vd'>V2, and the electrode 10 is again switched to the aforementioned machining enabling state.

As was described before, the machining gap between the electrode 10 and the workpiece 12 is always maintained to a suitable value while finish machining the workpiece 12 with the electrode 10.

It is noted that althrough the foregoing description is directed to a discharge machining operation in which the radius of the circular motion of the machining tool or the machining electrode is gradually expanded in the discharge machining apparatus, the discharge machining apparatus in the above embodiment is not limited only to this, but can be also applied to the discharge machining operation in which the machining tool or the machining electrode machines the outer periphery of the workpiece. In this case, the radius of the circular motion of the machining tool or the machining electrode is gradually decreased sufficiently with subtraction type counters used instead of the addition type counters in the previous embodiment.

In the above-described apparatus, the foregoing description is directed to the discharge machining operation in which the workpiece is fixed and the machining electrode is moved in a circular motion, but the same effect can also be obtained by the discharge machining operation in which the machining electrode is fixed and the workpiece is moved in a circular motion.

In the above-described embodiment, the foregoing description is directed to the fabricating machine employing instead a discharge machining apparatus, but the similar effect can also be obtained by a rockable machine such as a jig grinder, a milling machine and so forth attached with the discharge machining apparatus. In such machining operations, the load torque state can be detected by detecting the motor current of a rotary spindle thereof, thereby discriminating whether it is in no load machining disabling state or in an adequate load machining state, and similar control can be thus conducted without any difficulty in the technique so as to obtain the similar effect exerted in the above-described embodiment.

As is apparent from the above description, in the discharge machining apparatus shown in FIGS. 6 through 9, the discharge machining apparatus thus constructed according to the invention can discriminate whether the machining tool or the machining electrode is in the machining enabling state or in the machining disabling state when the tool or the electrode is moved in a circular motion relative to the workpiece, and can also optimally control the increased machining margin of the electrode at every cycle in response to the machining state of the electrode. Therefore, preferable discharge machining operation can be conducted in the above discharge machining apparatus, and a fabricating machine for machining the workpiece in preferable machining efficiency can be thus provided.

Figure 10:
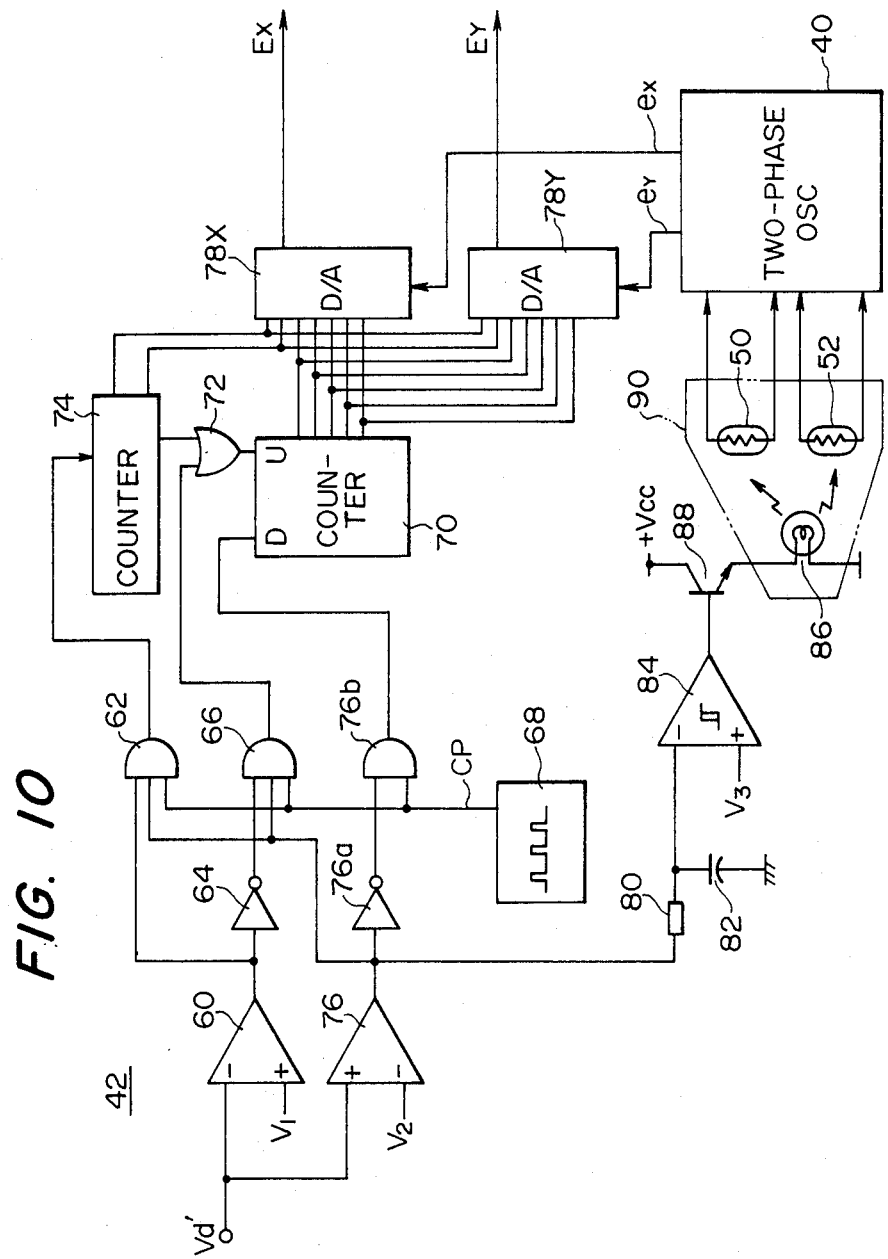
FIG. 10 is a circuit diagram showing another example of the control circuit for the two-phase oscillator.

FIG. 10 shows another preferred example of the control circuit 42, wherein like reference numerals designate similar or equivalent components and parts shown in FIG. 9, and the description thereof will be omitted. The control circut 42 of this embodiment further includes an inverter 76a connected to the output of the comparator 76. If the machining voltage detection signal Vd' is lower than the shortcircuit detection voltage V2, the comparator 76 compares the machining voltage detection signal Vd' with the shortcircuit detection voltage V2 and will produce a logic level "0" as discriminating as being occurred a shortcircuit between the electrode 10 and the workpiece 12 as deteriorated machining state. The low level output "0" from the comparator 76 is thus applied to both the AND gates 62 and 66, thereby closing the AND gates 62 and 66, and is also applied through the inverter 76a to an AND gate 76b, thereby opening the AND gate 76b. The clock pulses CP from the oscillator 68 are also applied to the other input of the AND gate 76b. Accordingly, in the above-described deteriorated machining state, the clock pulses CP from the oscillator 68 are inputted through the opened AND gate 76b to the subtraction input terminal (U) of the first counter 70. Thus, the discriminating means or device thus constructed will serve to discriminate whether the electrode 10 is in the machining enabling state or in the machining disabling state for the workpiece 12 and also to discriminate whether the workpiece is in the deteriorated machining state or not.

As apparent from the above description, in the machining enabling state only the AND gate 62 is opened, the clock pulses CP from the oscillator 68 are applied through the opened AND gate 62 through the second counter 74 to the first counter 70, and the counted outputs of the first and second counters 70 and 74 are counted up by one unit for one clock pulse CP. In the machining disabling state only the AND gate 66 is opened, the clock pulses CP from the oscillator 68 are applied through the opened AND gate 66 directly to the counter 70 through the OR gate 72, and the counted outputs of the counters 70 and 74 are counted up by four units for one clock pulse CP. In the deteriorated machining state only the AND gate 76b is opened, the clock pulses CP from the oscillator 68 are applied through the inverter 76a and the opened AND gate 76b, and the counted outputs of the counters 70 and 74 are counted down by four units for one clock pulse CP.

The control circuit 42 of this embodiment also includes a primary delay time constant circuit which has a resistor 80 connected between the output of the comparator 76 and the inverting input of a comparator 84 and a capacitor 82 connected between the inverting input of the comparator 84 and the ground, and the comparator 84. In the case where the machining voltage detection signal Vd' of lower state is continued longer than the primary delay time constant of the primary delay time constant circuit, the comparator 76 will continuously produce a logic level "0" therefrom. In this state, the charged capacitor 82 is discharged through the resistor 80, and the charging voltage of the capacitor 82 is thus decreased lower than a reference voltage V3, which is applied to the non-inverting input of the comparator 84.

When the capacitor 82 is thus discharged through the resistor 80 until the charging voltage of the capacitor 82 thus becomes lower than the reference voltage V3, the comparator 84 will produce a logic level "1".

The control circuit 42 of this embodiment also includes a transistor 88, a lamp 86 connected to the emitter circuit of the transistor 88 and a plurality of photoconductive cells 50 and 52 contained in a sealed case 90 as shown. The lamp 86 serves to irradiate uniformly the photoconductive cells 50 and 52 in the case 90, thereby decreasing the resistance values of the cells 50 and 52 and resultantly increasing the oscillation frequencies of the outputs $e_x$ and $e_y$ of the two-phase oscillator 40 (in FIG. 7). The high level output "1" from the comparator 84 is then applied to the base of the transistor 88 in which positive voltage +Vcc is applied to the collector thereof, thereby conducting the transistor 88 and consequently turning the lamp 86 on. In this manner, the primary delay time constant circuit having the resistor 80 and the capacitor 82, the comparator 84, the lamp 86, the transistor 88, and the photoelectric cells 50 and 52 are constructed to operate as electrode circular motion speed deciding means or device.

If a shortcircuit occurs between the electrode 10 and the workpiece 12 due to excessively narrow machining gap therebetween as an example, the machining voltage detection signal Vd' will fall in the relationship of V2>Vd', the comparator 76 compares the detection signal Vd' with the shortcircuit detection volage V2 and will produce a logic level "0" since the detection signal Vd' is lower than the shortcircuit detection voltage V2. Thus, the low level output "0" from the comparator 76 is applied through the inverter 76a to the AND gate 76b. Thus, the AND gate 76b is opened, and the clock pulses CP from the oscillator 68 are also applied to the other input of the AND gate 76b. Accordingly, the clock pulses CP from the oscillator 68 are inputted through the opened AND gate 76b to the subtraction input terminal (U) of the first counter 70, and the counted outputs of the counters 70 and 74 are counted down by four units for one clock pulse CP, and are in turn applied to the multiplication D/A converters 78X and 78Y. Thus, the outputs $E_x$ and $E_y$ of the D/A converters 78X and 78Y are accordingly decreased at the peak values, and the radii of the circular motion of the electrode 10 are gradually decreased by ΔR2. When the machining gap between the electrode 10 and the workpiece 12 is thus sufficiently expanded and the shortcircuit thus occurred is naturally removed in this manner, the machining voltage detection signal Vd' is returned to fall in the relationship of Vd'>V2, and the electrode 10 is again switched to the aforementioned machining enabling state.

If the shortcircuit between the electrode 10 and the workpiece 12 still continues even if the machining gap therebetween is sufficiently expanded, the charged capacitor 82 is discharged through the resistor 80, and is consequently lowered at the charging voltage thereof to be lower than the set reference voltage V3. Then, the comparator 84 will produce a high level output "1", thereby conducting the transistor 88 and accordingly turning the lamp 86 connected in the emitter circuit of the transistor 88 on. When the lamp 86 thus irradiates the photoelectric cells 50 and 52 in the case 90, the resistance values of the cells 50 and 52 are accordingly decreased. Thus, the oscillation frequencies of the outputs $e_x$ and $e_y$ from the two-phase oscillator 40 are resultantly increased. Thus, the period of the circular motion of the electrode 10 is increased to accelerate the peripheral speed of the electrode 10 at the workpiece 12, thereby remarkably increasing the machining chips and sludge exhausting effect in the machining gap between the electrode 10 and the workpiece 12. Since the radii of the circular motion of the electrode 10 is further reduced in the circular motion of the electrode 10, an over-cutting phenomenon of the electrode 10 to cause the deterioration of the machining accuracy of the electrode 10 can be eliminated, but the machining accuracy of the electrode 10 relative to the workpiece 12 can be maintained at the value in the circular motion at lower machining speed. In this manner, the machining chips and sluge in the machining gap can be efficiently exhausted, thereby rapidly eliminating the shortcircuit between the electrode 10 and the workpiece 12. Then, the electrode 10 is switched to the previous machining enabling state or the machining disabling state.

As was described before, the machining gap between the electrode 10 and the workpiece 12 is always maintained to a suitable value while finish machining the workpiece 12 with the electrode 10.

It is noted that although the foregoing description is directed to a discharge machining operation in which the radius of the circular motion of the machining tool or the machining electrode is gradually expanded in the discharge machining apparatus, the discharge machining apparatus in the above embodiment is not limited only to this, but can also be applied to the discharge machining operation in which the machining tool or the machining electrode machines the outer periphery of the workpiece. In this case, the radius of the circular motion of the machining tool or the machining electrode is gradually decreased sufficiently with subtraction type counters used instead of the addition type counters in the previous embodiment.

In the above-described apparatus, the foregoing description is also directed to the discharge machining operation in which the workpiece is fixed and the machining electrode is moved in a circular motion, but the same effect can also be obtained by the discharge machining operation in which the machining electrode is fixed and the workpiece is moved in a circular motion.

In the above-described embodiment, the foregoing description is directed to the fabricating machine employing instead a discharge machining apparatus, but the similar effect can also be obtained by a rockable machine such as a jig grinder, a milling machine and so forth attached with the discharge machining apparatus. In such machining operation, the load torque state can be detected by detecting the motor current of a rotary spindle thereof, thereby discriminating whether it is in no load machining disabling state or in an adequate load machining state, and similar control can be thus conducted without any difficulty in the technique so as to obtain the similar effect exerted in the above-described embodiment.

As is apparent from the above description, in the discharge machining apparatus shown in FIG. 10, the discharge machining apparatus thus constructed according to the invention can optimally control the width of the machining gap between the electrode and the workpiece in response to the machining state when the tool or the electrode is moved in a circular motion relative to the workpiece, can efficiently machine the workpiece, and can also expand the width of the machining gap therebetween and accelerate the circular motion speed of the electrode in the deteriorated machining state. Therefore, machining chips and sludge in the machining gap between the electrode and the workpiece can be effectively exhausted without adversely affecting the machining accuracy of the apparatus, and a fabricating machine for machining the workpiece which can be returned to the preferable machining state for extremely short time can be thus provided.

Figure 11:
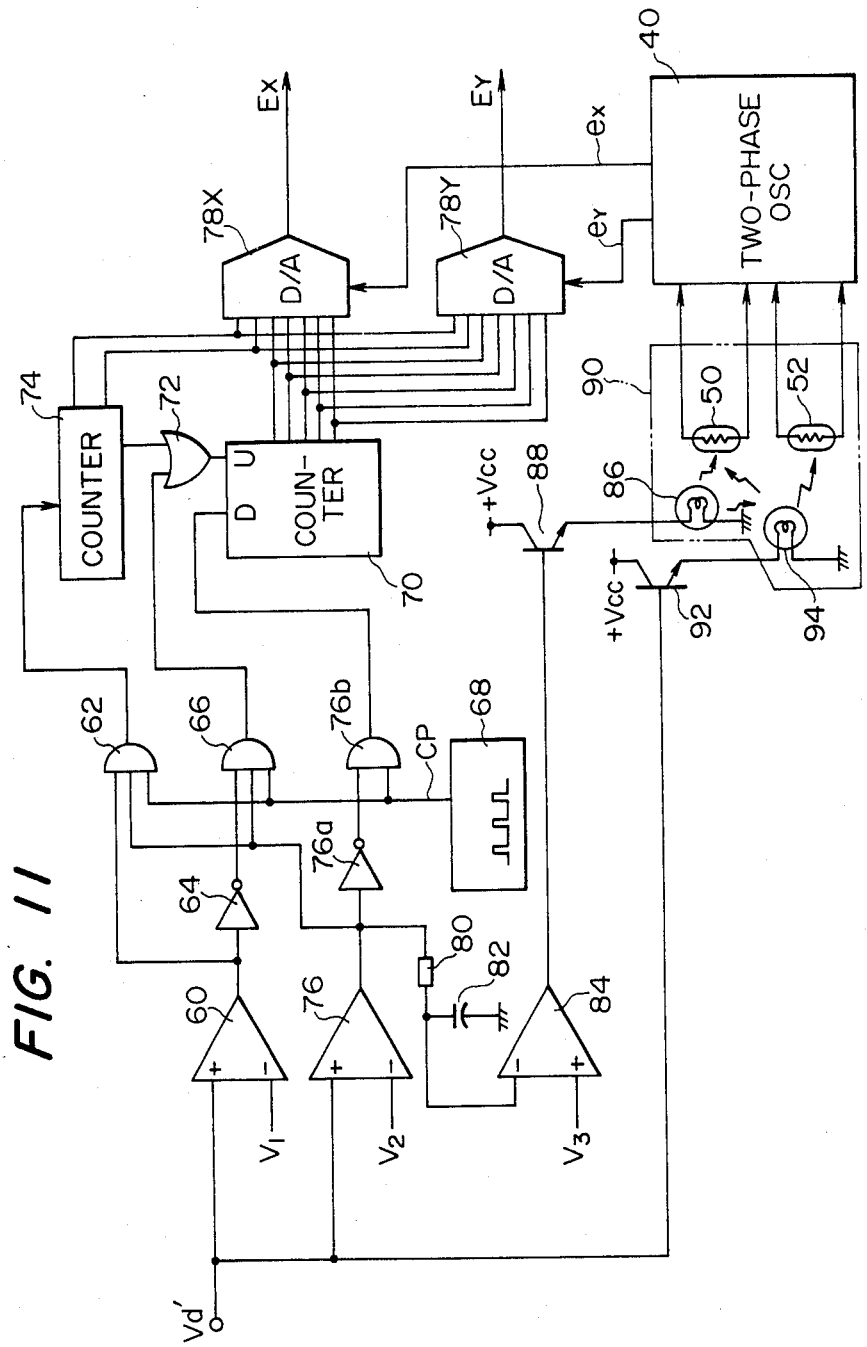
FIG. 11 is a circuit diagram showing a further example of the control circuit for the two-phase oscillator.

FIG. 11 shows a further example of the control circuit 42, wherein like reference numerals designate similar or equivalent components and parts shown in FIG. 10, and the description thereof will be omitted. The control circuit 42 of this embodiment further includes a transistor 92 for receiving the machining voltage detection signal Vd' at the base, a lamp 94 connected to the emitter circuit of the transistor 92 contained also in the sealed case 90 as shown.

If the machining voltage detection signal Vd' becomes higher than the shortcircuit detection voltage V2, the detection signal is applied to the base of the transistor 92, thereby controlling through resistance the transistor 92 and accordingly controlling the light emitting or irradiating state of the lamp 94 connected in the emitter circuit of the transistor 92. The lamp 94 thus irradiated will uniformly emits a light to the photoelectric cells 50 and 52 in the sealed case 90 in the same manner as the lamp 86. If the detection signal Vd' is accordingly higher than the detection voltage V2, the transistor 92 is conducted, thereby turning the lamp 94 on. The lamp 94 thus turned irradiates the photoelectric cells 50 and 52, and the resistance values of the cells 50 and 52 are accordingly decreased. Thus, the oscillation frequencies of the outputs $e_x$ and $e_y$ from the two-phase oscillator 40 are resultantly increased. If the detection voltage Vd' is lower than the detection voltage V2, the transistor 92 is turned off, the lamp 94 is accordingly turned off, and the resistance values of the cells 50 and 52 are consequently increased. Thus, the oscillation frequencies of the outputs $e_x$ and $e_y$ from the two-phase oscillators 40 are resultantly decreased. Thus, electrode circular motion speed deciding means or device is provided to determined the circular motion speed of the machining electrode with the resistors 80, the capacitors 82, the comparator 84, the lamps 86, 94, the transistors 88, 92 and the photoelectric cells 50, 52.

The circular motion speed of the electrode 10 is controlled in the machining enabling state or in the machining disabling state in the apparatus of the above embodiment as below. If the machining gap between the electrode 10 and the workpiece 12 is narrow and the machining voltage detection signal Vd' is lower than the shortcircuit detection voltage V2, the resistance value of the transistor 92 is large, and the current flowing through the transistor 92 is low and accordingly the current flowing through the lamp 94 is also low. Accordingly, the resistance values of the photoelectric cells 50 and 52 irradiated by the lamp 94 are consequently high. Thus, the oscillation frequencies of the outputs $e_x$ and $e_y$ of the two-phase oscillators 40 become low, and accordingly the circular motion speed of the electrode 10 is decelerated.

As the machining gap between the electrode 10 and the workpiece 12 is expanded, the machining voltage detection signal Vd' will become higher, and the resistance value of the transistor 92 will accordingly become gradually smaller or lower. Thus, the current flowing through the lamp 94 will consequently increase. As a result, the resistance values of the photoelectric cells 50 and 52 will become gradually lower, and the oscillation frequencies of the outputs $e_x$ and $e_y$ from the two-phase oscilators 40 will become higher, and accordingly the circular motion speed of the electrode 10 is accelerated. In this manner, the circular motion speed of the electrode 10 is optimally controlled in response to the machining gap between the electrode 10 and the workpiece 12 and accordingly the machining margin of the electrode 10. In the case, for example, where the machining gap between the electrode 10 and the workpiece 12 is narrow so that a shortcircuit tends to readily occur between the electrode 10 and the workpiece 12, the circular motion of the electrode 10 is decelerated, thereby securing sufficient time for the electrode 10 to escape upwardly and accordingly eliminating the friction between the electrode 10 and the workpiece 12. In the case where the machining gap between the electrode 10 and the workpiece 12 is excessively expanded, the circular motion speed of the electrode 10 is accelerated, thereby exhausting the machining chips and sludge in the machining gap.

As was described before, the machining gap between the electrode 10 and the workpiece 12 is always maintained to a suitable value while finish machining the workpiece 12 with the electrode 10.

It is noted that although the foregoing description is directed to a discharge machining apparatus in which the radius of the circular motion of the machining tool or the machining electrode is gradually expanded in the discharge machining apparatus, the discharge machining apparatus in the above embodiment is not limited only to this, but can also be applied to the discharge machining operation in which the machining tool or the machining electrode machines the outer periphery of the workpiece. In this case, the radius of the circular motion of the machining tool or the machining electrode is gradually decreased sufficiently with subtraction type counters used instead of the addition type counters in the previous embodiments.

In the above-described apparatus, the foregoing description is also directed to the discharge machining operation in which the workpiece is fixed and the machining electrode is moved in a circular motion, but the same effect can also be obtained by the discharge machining apparatus in which the machining electrode is fixed and the workpiece is moved in a circular motion.

In the above-described embodiment, the foregoing description is also directed to the fabricating machine employing instead a discharge machining apparatus, but the similar effect can also be obtained by a rockable machine such as a jig grinder, a milling machine and so forth attached with the discharge machining apparatus. In such machining operation, the load torque state can be detected by detecting the motor current of a rotary spindle thereof, thereby discriminating whether it is in no load machining disabling state or in an adequate load machining state, and similar control can be thus conducted without any difficulty in the technique so as to obtain the similar effect exerted in the above-described embodiment.

As is apparent from the above description, in the discharge machining apparatus shown in FIG. 11, the discharge machining apparatus thus constructed according to the invention can suitably control the circular motion speed of the electrode in response to the width of the machining gap between the electrode and the workpiece while adequately controlling the width of the machining gap therebetween in response to the machining state when moving the machining tool or the machining electrode in a circular motion relative to the workpiece, can thereby prevent the damage of the tool or the electrode due to the friction between the tool or the electrode and the workpiece, can preferably machine the workpiece, and can yet effectively exhaust the machining chips and sludge existed in the machining gap between the electrode and the workpiece due to the circular motion of the electrode. Therefore, a fabricating machine capable of remarkably improving the machining efficiency thereof can be provided.

Figure 12:
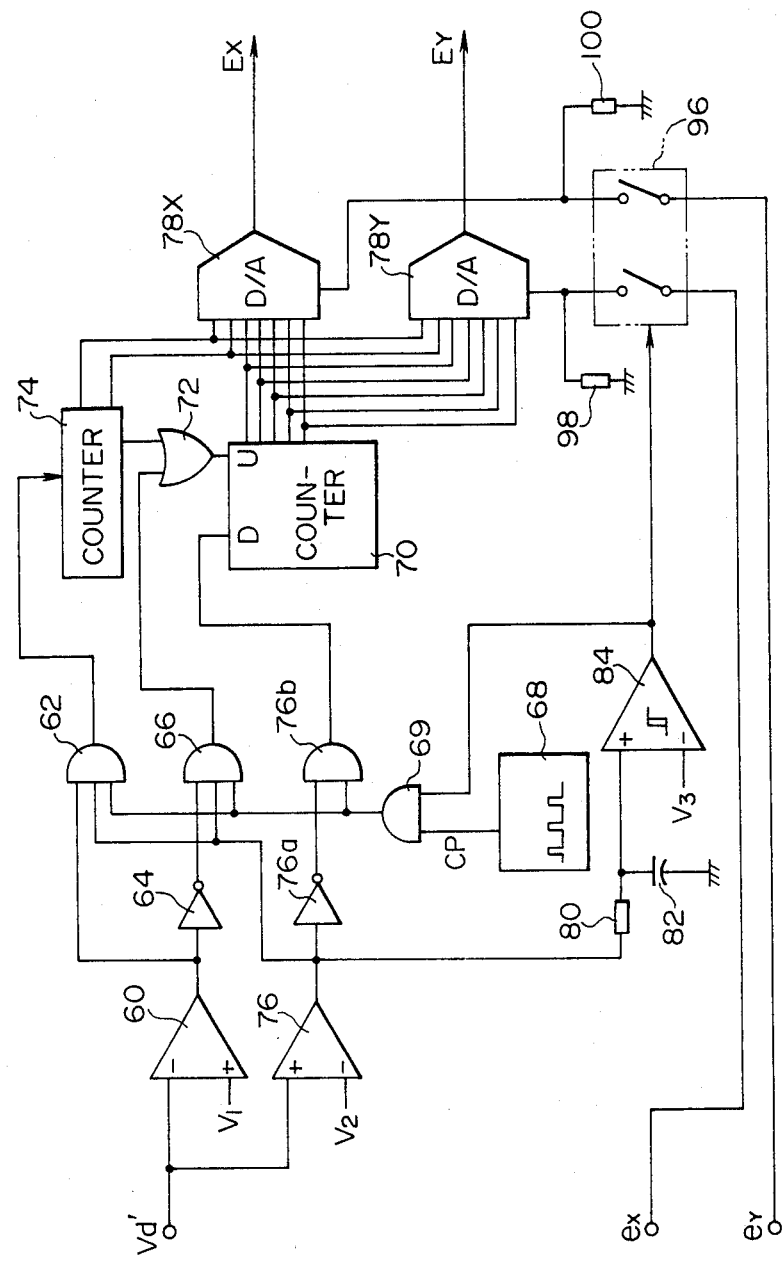
FIG. 12 is a circuit diagram showing a still further example of the control circuit for the two-phase oscillator.

FIG. 12 shows a still further example of the control circuit 42, wherein like reference numerals designate similar or equivalent components and parts shown in FIGS. 9 through 11, and the description thereof will be omitted. The control circuit 42 of this embodiment further includes an AND gate 69, which receives at one input clock pulses CP from the oscillator 68 or synchronized with the oscillation period of the output from the two-phase oscillator 40 and produces the clock pulses CP from the oscillator 68 to the another inputs of the AND gates 62, 66 and 76b.

In the case where the machining voltage detection signal Vd' of lower state is continued longer than the primary delay time constant of the primary delay time constant circuit, the comparator 76 will continuously produce a logic level "0" therefrom. In this state, the charged capacitor 82 is discharged through the resistor 80, and the charging voltage of the capacitor 82 is thus decreased lower than a reference voltage V3, which is applied to the inverting input of the comparator 84, wherein the resistor 80 is connected at one end to the non-inverting input of the comparator 84 and at the other to the output of the comparator 76.

When the capacitor 82 is thus discharged through the resistor 80 until the charging voltage of the capacitor 82 thus becomes lower than the reference voltage V3, the comparator 84 will produce a logic level "0", which is applied to the other input of the AND gate 69, thereby closing the AND gate 69. Thus, the clock pulses CP from the oscillator 68 are not fed through the AND gates 62, 66 and 76b to the counters 70 and 74.

The control circuit 42 of this embodiment also includes an analog switch 96 for switching the outputs $e_x$ and $e_y$ from the two-phase oscillator 40 therethrough to the D/A converters 78X and 78Y, and input resistors 100 and 98 connected between the input terminals of the converters 78X and 78Y for the outputs $e_x$ and $e_y$ from the oscillator 40 and the ground.

When the clock pulses CP from the oscillator 68 are eliminated to the counters 70 and 74, the output from the comparator 84 further disconnects the analog switch 96. When the switch 96 is thus disconnected, the outputs $e_x$ and $e_y$ from the oscillator 40 are also disconnected from the converters 78X and 78Y, and accordingly the converters 78X and 78Y will produce outputs $E_x$ and $E_y$ being zero. Thus, the circular motion of the electrode 10 is stopped, and the radius of the circular motion of the electrode 10 will abruptly converge zero. Since the comparator 84 incorporates a hysteresis characteristic, even if the machining voltage Vd is raised between the electrode 10 and the workpiece 12, the radius of the circular motion of the electrode 10 is not abruptly returned to the original radius. Accordingly, a hunting phenomenon that the radius of the circular motion of the electrode 10 is intermittently increased and decreased can be eliminated. As described above, the electrode moving path deciding means or device for controlling the circular motion of the electrode 10 is constructed.

If the shortcircuit between the electrode 10 and the workpiece 12 still continues even if the machining gap therebetween is sufficiently expanded, the charged capacitor 82 is discharged through the resistor 80, and is consequently lowered at the charging voltage thereof to be lowered than the set reference voltage V3. Then, the comparator 84 will produce a low level output "0", thereby closing the AND gate 69 and accordingly stopping feeding of the clock pulses CP from the oscillator 68 through the AND gate 69 and the AND gates 62, 66 and 76b to the counters 70 and 74. Further, the output "0" from the comparator 84 will also disconnect the analog switch 86, thereby stopping the outputs $e_x$ and $e_y$ from the two-phase oscillator 40 to the D/A converters 78X and 78Y.

Since the input terminals of the D/A converters 78X and 78Y for the outputs $e_x$ and $e_y$ from the oscillator 40 are grounded through the resistors 100 and 98, the inputs of the converters 78X and 78Y will become zero volt. Accordingly, the converters 78X and 78Y will instantaneously produce outputs $E_x$ and $E_y$ being zero. Consequently, the circular motion of the electrode 10 is instantaneously or immediately stopped, and the radius of the circular motion of the electrode 10 is abruptly converged toward the center to be thus rapidly reduced, thereby exhausting the machining chips and sludge accumulated in the machining gap between the electrode 10 and the workpiece 12 and accordingly increasing the machining gap therebetween so as to thus eliminate the shortcircuit therebetween.

Since the comparator 84 incorporates a hysteresis characteristic, even if the machining gap between the electrode 10 and the workpiece 12 is abruptly opened and the interelectrode voltage Vd and accordingly the machining voltage detection signal Vd' is raised, the radius of the circular motion of the electrode 10 is not immediately returned to the original radius. Accordingly, a hunting phenomenon that the radius of the circular motion of the electrode 10 is increased and decreased intermittently can be eliminated.

In the conventional discharge machining method and apparatus, if a shortcircuit between the electrode and the workpiece occurs so that the machining voltage detection signal Vd' is thus lowered, the electrode 10 is raised in a primary or main machining direction in the structure. However, in the discharge machining method and apparatus constructed according to the invention, even if a shortcircuit between the electrode and the workpiece occurs, the electrode 10 is moved in a direction for increasing the machining gap therebetween along a plane substantially perpendicular to the main or primary machining direction, and the electrode 10 is merely raised slightly in the primary machining direction for the purpose of expanding the machining gap therebetween at the bottom surface of the electrode 10 at an extremely slow speed. This is because the differential voltage Vd−Vs between the interelectrode voltage Vd and the reference voltage Vs becomes slightly minus or negative due to the shortcircuit between the electrode 10 and the workpiece 12, so that the slight negative component is applied through the resistor 37b of the circuit 36 to the servo mechanism for feeding the electrode 10 in a primary machining direction.

When the shortcircuit between the electrode 10 and the workpiece 12 is thus removed and the machining chips and sludge in the machining gap therebetween are exhausted, the machining voltage detection signal Vd' is returned to the relationship of Vd'>V2, the apparatus is switched to the machining disabling state or machining enabling state, and will start again the circular motion of the electrode 10 in the deepest position of the hole thus machined in the workpiece 12. Accordingly, the finish machining operation is restarted with the entire side surface of the electrode 10, and the electrode 10 is not consumed locally.

As was described before, the machining gap between the electrode 10 and the workpiece 12 is always maintained to a suitable value while finish machining the workpiece 12 with the electrode 10.

It is noted that though the foregoing description is directed to a discharge machining apparatus in which the radius of the circular motion of the machining tool or the machining electrode is gradually expanded in the discharge machining apparatus, the discharge machining apparatus in the above embodiment is not limited only to this, but can also be applied to the discharge machining operation in which the machining tool or the machining electrode machines the outer periphery of the workpiece. In this case, the radius of the circular motion of the machining tool or the machining electrode is gradually decreased sufficiently with subtraction type counters used instead of the addition type counters in the previous embodiments.

In the above-described apparatus, the foregoing description is also directed to the discharge machining operation in which the workpiece is fixed and the machining electrode is moved in a circular motion relative to the workpiece, but the same effect can also be obtained by the discharge machining apparatus in which the machining electrode is fixed and the workpiece is moved in a circular motion.

As is evident from the above description, in the discharge machining method and apparatus for machining a workpiece 12 by moving an electrode 10 relative to the workpiece 12 in a circular motion along a plane substantially perpendicular to the primary machining direction for finish machining the workpiece thus constructed according to the invention, the machining state of the workpiece with the electrode is detected, and the radius of the circular motion of the electrode is expanded or reduced so that the machining gap between the electrode and the workpiece becomes optimum in response to the machining state. Therefore, the finish machining can be preferably conducted efficiently. Further, when deteriorated machining state such as a shortcircuit between the electrode and the workpiece occurs, the circular motion of the electrode is stopped, and the radius of the circular motion of the electrode is abruptly expanded or reduced in a direction for increasing the machining gap therebetween along a plane substantially perpendicular to the primary machining direction. Accordingly, the local consumption of the electrode can be eliminated, the workpiece cannot be transferred with the consumed shape of the electrode, but can be accurately machined, and the machining chips and sludge in the machining gap can be effectively exhausted by a pumping action caused upon abrupt movement of the electrode.

What is claimed is:

1. A fabricating machine in which a machining tool or a machining electrode is moved in a circular motion relative to an electrically conductive workpiece while generating a discharge between said electrode and workpiece for machining said workpiece while gradually changing a radius of a moving path of said tool or said electrode a predetermined amount comprising:

discriminating means for determining whether said machining tool or said machining electrode is in a machining enabling state, wherein said discharge can properly take place, or in a machining disabling state wherein said discharge cannot properly take place, while said tool or said electrode is moved in a circular motion; and tool or electrode moving path deciding means for changing the radius of the moving path of said tool or said electrode at a first rate for reducing the distance between said electrode and workpiece when said discriminating means determines the machining enabling state and for changing the moving path of said tool or said electrode at a second rate larger than said first rate to reduce said distance when said discriminating means determines the machining disabling state.

2. The fabricating machine as claimed in claim 1 in which said discriminating means comprises a differential transformer connected to said electrode for detecting the position of said electrode in a predetermined direction, and comparison selecting means responsive to the output of said transformer for preferentially selecting the lower voltage of differential voltage between the voltage corresponding to the machining gap between said electrode and said workpiece and a reference voltage and the output from said transformer.

3. A fabricating machine in which a machining tool or a machining electrode is moved in a circular motion relative to an electrically conductive workpiece while generating a discharge between said electrode and workpiece for machining said workpiece while gradually expanding or reducing a radius of the moving path of said tool or said electrode a predetermined amount comprising:

discriminating means for determining whether said machining tool or said machining electrode is in a machining enabling state wherein said discharge can properly take place, or in a machining disabling state wherein said discharge cannot properly take place, while said tool or said electrode is moved in a circular motion; and tool or electrode moving path deciding means for expanding or reducing the radius of the moving path of said tool or said electrode at a first rate when said discriminating means determines the machining enabling state and for expanding or reducing the moving path of said tool or said electrode at a second rate larger than said first rate when said discriminating means determines the machining disabling state, wherein said tool or electrode moving path deciding means comprises a two-phase oscillator for producing sine wave outputs of different phase at 90°, control circuit means responsive to the outputs from said oscillator for controlling the outputs from said oscillator in accordance with an interelectrode voltage detection signal and producing outputs corresponding to predetermined eccentric radii of the circular motion of said electrode, addition point means responsive to the outputs from said control circuit means and outputs from linear potentiometers mounted at said electrode for detecting the position of said electrode in a plane perpendicular to the primary direction of said electrode, and driving means responsive to the outputs from said addition points for driving said electrode in lateral and logitudinal directions.

4. The fabricating machine as claimed in claim 3 in which said two-phase oscillator comprises integrating means having an operational amplifier, a resistor connected between the inverting input of said amplifier and ground, and a capacitor connected between the output and the inverting input of said amplifier; a limiting inversion integrating circuit means having a second operational amplifier, a second resistor connected between the output of said first amplifier and the inverting input of said second amplifier, a second capacitor connected between the output and the inverting input of said second amplifier, and voltage limiting zener diodes connected in reverse series with one another and connected in parallel with said second capacitor, wherein said integrating means is connected in cascade with said inversion integrating circuit means in a feedback loop of predetermined relationship.

5. The fabricating machine as claimed in claim 3 in which can control circuit means comprises
- a first comparator responsive to the interelectrode voltage detection signal and a machining enabling voltage for comparing said interelectrode voltage detecting signal with said machining enabling voltage in which discharge machining gap between said electrode and said workpiece is higher than a predetermined value,
- a second comparator responsive to the interelectrode voltage detection signal and a shortcircuit detection voltage in which the interelectrode voltage detection signal is lower than a predetermined value for comparing said interelectrode voltage detection signal with said shortcircuit detection voltage;
- a first AND gate responsive to the outputs of said first and second comparators and a clock pulse for passing the clock pulse;
- an inverter responsive to the output of said first comparator for inverting the output from said first comparator;
- a second AND gate responsive to the output of said second comparator and the output of said inverter and clock pulse for passing the clock pulse;
- a clock pulse oscillator for producing a clock pulse synchronized with said two-phase oscillator;
- first counter responsive to the output from said second AND gate for counting the output from said second AND gate;
- second counter responsive to the output from said first AND gate for counting the output from said first AND gate;
- first and second D/A converters responsive to the outputs from said first and second counters for multiplying the outputs from said first and second counters with outputs from said two-phase oscillator.

6. A fabricating machine in which a machining tool or a machining electrode is moved substantially in a circular motion relative to an electrically conductive workpiece while generating a discharge between said electrode and workpiece for machining said workpiece while gradually expanding or reducing a radius of a moving path of said electrode a predetermined amount under the control of the width of a machining gap between said electrode and said workpiece comprising:
- discriminating means for detecting whether said machining tool or said machining electrode is in a machining enabling state wherein said discharge can properly take place, in a machining disabling state wherein said discharge cannot properly take place, or in a deteriorated machining state wherein a short circuit exists between said electrode and said workpiece, while said tool or said electrode is moved in a circular motion;
- tool or electrode moving path deciding means for reducing the width of the machining gap between said electrode and said workpiece by a first amount when said discriminating means detects the machining enabling state, reducing the width of said machining gap by a second amount larger than said first amount when said discriminating means detects the machining disabling state and expanding the width of said machining gap when said discriminating means detects the deteriorated machining state, to thereby control the expansion or reduction of the moving path of said tool or said electrode; and
- circulation motion speed deciding means for selecting faster circular motion speed of said electrode when at least two circular motion speeds are set and said discriminating means detects the deteriorated machining state and selecting slower circular motion speed of said tool or said electrode when said discriminating means detects other than the deteriorated machining state to thereby control the circular motion of said tool or said electrode.

7. The fabricating machine as claimed in claim 6 in which said discriminating means comprises a differential transformer connected to said electrode for detecting the position of said electrode in a predetermined direction, and comparison selecting means responsive to the output of said transformer for preferentially selecting the lower voltage of the differential voltage between the voltage corresponding to the machining gap between said electrode and said workpiece and a reference voltage and the output from said transformer.

8. A fabricating machine in which a machining tool or a machining electrode is moved substantially in a circular motion relative to an electrically conductive workpiece while generating an electric discharge between said electrode and workpiece for machining said workpiece while gradually expanding or reducing the radius of the moving path of said electrode a predetermined amount under the control of the width of a machining gap between said electrode and said workpiece comprising:
- discriminating means for detecting whether said machining tool or said machining electrode is in a machining enabling state wherein said electric discharge can properly take place, in a machining disabling state wherein said electric discharge cannot properly take place, or in a deteriorated machining state wherein a short circuit exists between said electrode and said workpiece, while said tool or said electrode is moved in a circular motion;
- tool or electrode moving path deciding means for reducing the machining gap between said electrode and said workpiece by a first amount when said discriminating means detects the machining enabling state, reducing said machining gap by a second amount greater than said first amount when said discriminating means detects the machining disabling state and expanding the width of said machining gap when said discriminating means detects the deteriorated machining state, to thereby control the expansion or reduction of the moving path of said tool or said electrode, wherein said tool or electrode moving path deciding means comprises two-phase oscillator for producing sine wave outputs of differential phase at 90°, control circuit means responsive to the outputs from said oscillator for controlling the outputs from said oscillator in accordance with an interelectrode voltage detection signal and producing outputs corresponding to predetermined eccentril radii of the circular motion of said electrode, addition point means responsive to the outputs from said control circuit means and output from linear potentiometers mounted at said electrode for detecting the position of said electrode in a plane perpendicular to the primary machining direction of said electrode, and driving means responsive to the outputs from said addition point means for driving said electrode in lateral and longitudinal directions; and circular motion speed deciding means for selecting a faster circular motion speed of said tool or said electrode when at least two circular motion speeds are set and said discriminating means detects the deteriorated machining state and selecting a slower circular motion speed of said tool or said electrode when said discriminating means detects other than the deteriorated machining state to thereby control the circular motion of said tool or said electrode.

9. The fabricating machine as claimed in claim 8 in which said two-phase oscillator comprises integrating means having an operational amplifier, a resistor connected between the inverting input of said amplifier and ground, and a capacitor connected between the output and the inverting input of said amplifier; a limiting inversion integrating circuit means having a second operational amplifier, a second resistor connected between the output of said first amplifier and the inverting input of said second amplifier, a second capacitor connected between the output and the inverting input of said second amplifier, and voltage limiting zener diodes connected in reverse series with one another and connected in parallel with said second capacitor, wherein said integrating means is connected in cascade with said inversion integrating circuit means in a feedback loop of predetermined relationship.

10. The fabricating machine as claimed in claim 8 in which said control circuit means comprises;
first comparator responsive to the interelectrode voltage detection signal and a machining enabling voltage for comparing said interelectrode voltage detection signal with said machining enabling voltage of predetermined relationship;
a second comparator responsive to the interelectrode voltage detection signal and a shortcircuit detection voltage of predetermined relationship for comparing said interelectrode voltage detection signal with said shortcircuit detection voltage;
a first AND gate responsive to the outputs of said first and second comparators and a clock pulse for passing the clock signal;
a first inverter responsive to the output of said first comparator for inverting the output from said first comparator;
a second AND gate responsive to the output of said first inverter, the output of said second comparator and a clock pulse for passing the clock signal;
a second inverter responsive to the output of said second comparator for inverting the output of said second comparator;
a third AND gate responsive to the output of said second inverter and a clock pulse for passing the clock signal;
a clock pulse oscillator for producing a clock pulse synchronized with said two-phase oscillator;
first counter responsive to the output from said third AND gate for counting the output from said third AND gate;
second counter responsive to the output from said first or second AND gate for counting the output from said first or second AND gate; and
first and second D/A converters responsive to the outputs from said first and second counters for multiplying the outputs from said first and second counters by the outputs from said two-phase oscillator.

11. The fabricating machine as claimed in claim 10 in which said control circuit means further comprises:
a primary delay time constant circuit means having a resistor connected between the output of said second comparator and the inverting input of a third comparator and a capacitor connected between the inverting input of said third comparator and ground;
a third comparator responsive to the output of said primary delay time constant circuit means and a reference voltage for comparing the output of said primary delay time constant circuit means with said reference voltage;
a transistor connected at the base thereof to the output of said third comparator and at the collector thereof to a positive power source;
a lamp connected to the emitter circuit of said transistor; and
at least one photoelectric cell irradiated by said lamp thereby decreasing the resistance value thereof for increasing the oscillation frequency of the outputs of said two-phase oscillator.

12. A fabricating machine in which a machining tool or a machining electrode is moved substantially in a circular motion relative to an electrically conductive workpiece while generating an electric discharge between said electrode and workpiece for machining said workpiece while gradually expanding or reducing the radius of the moving path of said tool or said electrode comprising:
discriminating means for detecting the width of said machining gap between said tool or said electrode and said workpiece and the machining state of said tool or said electrode while said tool or said electrode is moved in a circular motion, wherein said discriminating means comprises a differential transformer connected to said electrode for detecting the position of said electrode in a predetermined direction, and comparison selecting means responsive to the output of said transformer for preferentially selecting the lower voltage of differential voltage between the voltage corresponding to the machining gap between said electrode and the workpiece and a reference voltage and the output from said transformer;

tool or electrode moving path deciding means for expanding or reducing the moving path of said tool or said electrode in a direction for reducing the width of said machining gap between said tool or said electrode and said workpiece on the basis of the machining state detected by said discriminating means and expanding or reducing the moving path of said tool or said electrode in a direction for increasing the width of said machining gap therebetween when the width of said machining gap therebetween detected by said discriminating means becomes extraordinarily narrow, wherein said tool or electrode moving path deciding means comprises two-phase oscillator for producing sine wave outputs of differential phase at 90°, control circuit means responsive to the outputs from said oscillator for controlling the outputs from said oscillator in accordance with an interelectrode voltage detection signal and producing outputs corresponding to predetermined eccentric radii of the circular motion of said electrode, addition point means responsive to the outputs from said control circuit means and outputs from linear potentiometers mounted at said electrode for detecting the position of said electrode in a plane perpendicular to the primary machining direction of said electrode, and driving means responsive to the outputs from said addition point means for driving said electrode in lateral and longitudinal directions; and circular motion speed deciding means for controlling the circular motion speed of said tool or said electrode on the basis of the width of said machining gap therebetween detected by said discriminating means by increasing the width of the machining gap therebetween and subsequently accelerating the circular motion speed of said tool or said electrode when the width of said machining gap therebetween detected by said discriminating means becomes extraordinarily narrow.

13. The fabricating machine as claimed in claim 12 in which said control circuit means comprises:

first comparator responsive to the interelectrode voltage detection signal and a machining enabling voltage for comparing said interelectrode voltage detection signal with said machining enabling voltage of predetermined relationship;

a second comparator responsive to the interelectrode voltage detection signal and a shortcircuit detection voltage of predetermined relationship for comparing said interelectrode voltage detection signal with said shortcircuit detection voltage;

a first AND gate responsive to the outputs of said first and second comparators and a clock pulse for passing the clock signal;

a first inveter responsive to the output of said first comparator for inverting the output from said first comparator;

a second AND gate responsive to the output of said first inverter, the output of said second comparator and a clock pulse for passing the clock signal;

a· second inverter responsive to the output of said second comparator for inverting the output of said second comparator;

a third AND gate responsive to the output of said second inverter and a clock pulse for passing the clock signal;

a clock pulse oscillator for producing a clock pulse synchronized with said two-phase oscillator;

first counter responsive to the output from said third AND gate for counting the output from said third AND gate;

second counter responsive to the output from said first or second AND gate for counting the output from said first or second AND gate;

first and second D/A converters responsive to the outputs from said first and second counters for multiplying the outputs from said first and second counters by the outputs from said two-phase oscillator;

a primary delay time constant circuit means having a resistor connected between the output of said second comparator and the inverting input of a third comparator and a capacitor connected between the inverting input of said third comparator and the ground;

a third comparator responsive to the output of said primary delay time constant circuit means and a reference voltage for comparing the output of said primary delay time constant circuit means with said reference voltage;

a first transistor connected at the base thereof to the output of said third comparator and at the collector thereof to a positive power soruce;

a lamp connected to the emitter circuit of said first transistor;

at least one photoelectric cell irradiated by said lamp thereby decreasing the resistance value thereof for increasing the oscillation frequency of the outputs of said two-phase oscillator;

a second transistor connected at the base thereof to the interelectrode voltage detection signal and at the collector thereof to a positive power source; and a second lamp connected to the emitter circuit of said second transistor for irradiating the photoelectric cell.

14. A discharge machining apparatus for machining an electrically conductive workpiece by applying electric current to the machining gap between said electrode and said workpiece to generate an electric discharge between said electrode and workpiece while moving said electrode and said workpiece relative to each other in a primary or main machining direction, substantially controlling the machining gap in an electric discharge enabling state along a plane substantially perpendicular to the primary machining direction and finish machining said workpiece by moving said electrode relative to said workpiece substantially in a circular motion comprising:

discriminating means for detecting whether said workpiece in a finish machining step is in a machining enabling state wherein said electric discharge can properly take place, in a machining disabling state wherein said electric discharge cannot properly take place or in a deteriorated machining state wherein a short circuit exists between said electrode and said workpiece; and circular motion moving path deciding means for gradually changing the radius of the circular motion of said electrode at a first rate for reducing said machining gap when said discriminating means detects the machining enabling state and at a second rate greater than said first rate for reducing said machining gap when said discriminating means detects the machining disabling state, gradually changing the radius of the circular motion of said electrode to increase said machining gap when said discriminating means detects the deteriorated machining state, and abruptly changing the radius of the circular motion of said electrode in a direction for increasing the machining gap therebetween along a plane substantially perpendicular to the primary or main machining direction while stopping the circular motion of said electrode when the deteriorated machining state is continuously detected for a predetermined time.

15. The discharge machining apparatus as claimed in claim 14 in which said discriminating means comprises a differential transformer connected to said electrode for detecting the position of said electrode in a predetermined direction, and comparison selecting means responsive to the output of said transformer for preferentially selecting the lower voltage of the differential voltage between the voltage corresponding to the machining gap between said electrode and said workpiece and a reference voltage and the output from said transformer.

16. The apparatus as claimed in claim 14 wherein said circular moving path deciding means for changing said radius of circular motion comprises means for increasing said radius to reduce said machining gap during said finish machining.

17. A discharge machining apparatus for machining an electrically conductive workpiece by applying electric current to the machining gap between said electrode and said workpiece to generate an electric discharge between said electrode and workpiece while moving said electrode and said workpiece relative to each other in a primary or main machining direction, substantially controlling the machining gap in an electric discharge enabling state along a plane substantially perpendicular to the primary machining direction and finish machining said workpiece for moving said electrode relative to said workpiece substantially in a circular motion comprising:

discriminating means for detecting whether the machining state of said workpiece by said electrode in a finish machining step is in a machining enabling state wherein said electric discharge can properly take place, in a machining disabling state wherein said electric discharge cannot properly take place, or in a deteriorated machining state wherein a short circuit exists between said electrode and said workpiece, wherein said discriminating means comprises a differential transfromer connected to said electrode for detecting the position of said electrode in a predetermined direction, and comparison selecting means responsive to the output of said transformer for preferentially selecting the lower voltage of the differential voltage between the voltage corresponding to the machining gap between said electrode and said workpiece and a reference voltage and the output from said transformers; and circular motion moving path deciding means for gradually expanding or reducing the radius of the circular motion of said electrode at a first rate when said discriminating means detects the machining enabling state and at a second rate greater than said first rate when said discriminating means detects the machining disabling state, gradually expanding or reducing the radius of the circular motion of said electrode when said discriminating means detects the deteriorated machining state, and abruptly expanding or reducing the radius of the circular motion of said electrode in a direction for increasing the machining gap therebetween along a plane substantially perpendicular to the primary or main machining direction while stopping the circular motion of said electrode when the deteriorated machining state is continuously detected for a predetermined time, wherein said circular motion moving path deciding means comprises a two-phase oscillator for producing sine wave outputs of differential phase at 90°, control circuit means responsive to the outputs from said oscillator for controlling the outputs from said oscillator in accordance with an interelectrode voltage detection signal and producing outputs corresponding to predetermined eccentric radii of the circular motion of said electrode, addition point means responsive to the outputs from said control circuit means and outputs from linear potentiometers mounted at said electrode for detecting the position of said electrode in a plane perpendicular to the primary machining direction of said electrode, and driving means responsive to the outputs from said addition point means for driving said electrode in lateral and longitudinal directions.

18. The apparatus as claimed in claim 17 in which said control circuit means comprises:

a first comparator responsive to the interelectrode voltage detection signal and machining enabling voltage for comparing said interelectrode voltage detection signal with said machining enabling voltage of predetermined relationship;

a second comparator responsive to the interelectrode voltage detection signal and a shortcircuit detection voltage of predetermined relationship for comparing said interelectrode voltage detection signal with said shortcircuit detection voltage;

a first AND gate responsive to the outputs of said first and second comparators and a clock pulse for passing the clock signal;

a first inverter responsive to the output of said first comparator for inverting the output from said first comparator;

a second AND gate responsive to the output of said first inverter, the output of said second comparator and a clock pulse for passing the clock signal;

a second inverter responsive to the output of said second comparator for inverting the output of said second comparator;

a third AND gate responsive to the output of said second inverter and a clock pulse for passing the clock pulse;

a fourth AND gate responsive to the output of said clock signal for passing the clock signal for passing the clock pulse;

a clock pulse oscillator for producing a clock pulse synchronized with said two-phase oscillator;

first counter responsive to the output from said third AND gate for counting the output from said third AND gate;

second counter responsive to the output from said first or second AND gate for counting the output from said first or second AND gate;

first and second D/A converters responsive to the outputs from said first and second counters for multiplying the outputs from said first and second counters by the outputs from said two-phase oscillators;

a primary delay time constant circuit means having a resistor connected between the output of said second comparator and the non-inverting input of a third comparator and a capacitor connected between the non-inverting input of said third comparator and the ground;

third comparator responsive to the output of said primary delay time constant circuit means and a reference voltage for comparing the output of said primary delay time constant circuit means with said reference voltage;

an analog switch connected to the outputs of said two-phase oscillator and the inputs of said first and second D/A converters; and input resistors connected between the inputs of said first and second D/A converters and the ground.

* * * * *